(12) United States Patent
Park et al.

(10) Patent No.: US 12,449,842 B2
(45) Date of Patent: Oct. 21, 2025

(54) STRAP STRUCTURE CONNECTED TO HOUSING, AND WEARABLE ELECTRONIC DEVICE COMPRISING SAME

(71) Applicant: Samsung Electronics Co., Ltd., Suwon-si (KR)

(72) Inventors: Sungeun Park, Suwon-si (KR); Donghun Song, Suwon-si (KR); Jiwoong Park, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 140 days.

(21) Appl. No.: 18/329,146

(22) Filed: Jun. 5, 2023

(65) Prior Publication Data

US 2023/0305594 A1    Sep. 28, 2023

Related U.S. Application Data

(63) Continuation of application No. PCT/KR2022/000257, filed on Jan. 6, 2022.

(30) Foreign Application Priority Data

Mar. 8, 2021 (KR) .................. 10-2021-0030232

(51) Int. Cl.
  *A44C 5/14* (2006.01)
  *G04G 17/04* (2006.01)
  *G06F 1/16* (2006.01)
(52) U.S. Cl.
  CPC .............. *G06F 1/163* (2013.01); *A44C 5/147* (2013.01); *G04G 17/045* (2013.01)
(58) Field of Classification Search
  CPC ............... G04B 37/1486; G04B 37/18; G04B 37/1493; A44C 5/147; A44C 5/0007;
  (Continued)

(56) References Cited

U.S. PATENT DOCUMENTS 6,176,612 B1   1/2001   Chagnoux
6,408,491 B2   6/2002   Guyard
(Continued)

FOREIGN PATENT DOCUMENTS

CN   211354127 U   8/2020
EP   0 904 572 B1   1/2005
(Continued)

OTHER PUBLICATIONS

International Search Report dated Apr. 25, 2022, issued in International Patent Application No. PCT/KR2022/000257.
(Continued)

*Primary Examiner* — Jack W Lavinder
(74) *Attorney, Agent, or Firm* — Jefferson IP Law, LLP

(57) ABSTRACT

A strap structure and a wearable electronic device comprising same, the strap structure being connected to one side of a housing are provided. The strap structure includes a strap body, a holder body connected to one side of the strap body, a first holder part, which protrudes toward the inside of the housing from the end on one side of the holder body, and is inserted into the housing at an angle of inclination greater than 0° and less than 90° in the inward direction of the housing, with the horizontal direction being defined as 0° and the vertical direction defined as 90° or −90° when the housing is placed with the center thereof facing upward, and a second holder part arranged at the end on the other side of the holder body and inserted into the housing at an angle of inclination less than 0° and greater than −90°.

15 Claims, 14 Drawing Sheets

(58) Field of Classification Search
CPC ....... A44C 5/0053; A44C 5/14; A44C 5/2057; G04G 17/06; Y10T 24/4782
See application file for complete search history.

(56) References Cited

U.S. PATENT DOCUMENTS

| | | | |
|---|---|---|---|
| 9,894,964 | B2 | 2/2018 | Perkins et al. |
| 10,123,593 | B2 | 11/2018 | Perkins et al. |
| 10,182,623 | B2 | 1/2019 | Perkins et al. |
| 10,575,602 | B2 | 3/2020 | Perkins et al. |
| 10,820,669 | B2 | 11/2020 | Chen |
| 10,945,496 | B2 | 3/2021 | Perkins et al. |
| 11,357,293 | B2 | 6/2022 | Hu et al. |
| 11,528,970 | B2 | 12/2022 | Xue |
| 2001/0016971 | A1 | 8/2001 | Guyard |
| 2007/0143970 | A1* | 6/2007 | Loetscher ................ A44C 5/14 24/265 B |
| 2009/0175135 | A1* | 7/2009 | Moore ................ A44C 5/0053 368/282 |
| 2011/0113599 | A1* | 5/2011 | Ehrsam ............. G04B 37/1486 24/700 |
| 2014/0353349 | A1* | 12/2014 | De Oliveira ............ A44C 5/14 224/164 |
| 2016/0037876 | A1 | 2/2016 | Hu et al. |
| 2018/0295951 | A1 | 10/2018 | Keller |
| 2020/0019121 | A1* | 1/2020 | Han ........................ A44C 5/14 |
| 2020/0154835 | A1 | 5/2020 | Chen |
| 2020/0209807 | A1* | 7/2020 | Lazzari .............. G04B 37/1486 |
| 2020/0405017 | A1* | 12/2020 | Hu ..................... G04B 37/1486 |
| 2021/0059362 | A1 | 3/2021 | Xue |
| 2021/0085041 | A1* | 3/2021 | Schlichtig .............. G04B 37/22 |
| 2023/0053920 | A1 | 2/2023 | Xue |
| 2023/0189941 | A1* | 6/2023 | Schlichtig .......... A44B 11/2596 24/265 R |
| 2023/0189943 | A1* | 6/2023 | Mueller ............. G04B 37/1486 224/164 |
| 2023/0200500 | A1* | 6/2023 | Schlichtig ................ A44C 5/14 63/3.1 |
| 2024/0081493 | A1* | 3/2024 | Schlichtig .......... G04B 37/1486 |

FOREIGN PATENT DOCUMENTS

| | | |
|---|---|---|
| JP | H01-074813 U | 5/1989 |
| JP | 2000-329868 A | 11/2000 |
| JP | 2001-255385 A | 9/2001 |
| JP | 2001-272479 A | 10/2001 |
| KR | 10-2017-0020226 A | 2/2017 |
| KR | 10-1808051 B1 | 12/2017 |
| WO | 2017/084944 A1 | 5/2017 |

OTHER PUBLICATIONS

Extended European Search Report dated May 14, 2024, issued in European Patent Application No. 22767296.1.

* cited by examiner

<301>

<303>

<305>

<307>

STRAP STRUCTURE CONNECTED TO HOUSING, AND WEARABLE ELECTRONIC DEVICE COMPRISING SAME

CROSS-REFERENCE TO RELATED APPLICATION(S)

This application is a continuation application, claiming priority under § 365(c), of an International application No. PCT/KR2022/000257, filed on Jan. 6, 2022, which is based on and claims the benefit of a Korean patent application number 10-2021-0030232, filed on Mar. 8, 2021, in the Korean Intellectual Property Office, the disclosure of which is incorporated by reference herein in its entirety.

BACKGROUND

1. Field

The disclosure relates to a wearable electronic device.

2. Description of Related Art

Conventional portable electronic devices are on sale in various forms, for example, a form of wearing them on a wrist or a form that hangs around a neck.

The above information is presented as background information only to assist with an understanding of the disclosure. No determination has been made, and no assertion is made, as to whether any of the above might be applicable as prior art with regard to the disclosure.

SUMMARY

The electronic devices that are worn on the wrists or hung on the necks includes a strap related to wearing, and includes a housing, to which the strap is connected. Because the housing has to provide a structure (e.g., a lug), a portion of which protrudes for connection of a strap, there is many restrictions in design of an external appearance of the wearable electronic device. Furthermore, the conventional wearable electronic device has a limited inner space of the housing for connection of the strap.

Aspects of the disclosure are to address at least the above-mentioned problems and/or disadvantages and to provide at least the advantages described below. Accordingly, an aspect of the disclosure is to provide a strap structure connected to a housing, by which an inner space of the housing may be properly secured while a strap connecting structure is simplified and a design of an external appearance of the housing is diversified, and a wearable electronic device including the same.

Additional aspects will be set forth in part in the description which follows and, in part, will be apparent from the description, or may be learned by practice of the presented embodiments.

In accordance with an aspect of the disclosure, a strap structure connected to one side of a housing is provided. The strap structure includes a strap body, a holding body connected to one side of the strap body, a first holding part protruding from one end of the holding body in an inward direction of the housing, and inserted into an inside of the housing while having an inclination angle of a positive value that is larger than 0 degrees and smaller than 90 degrees in a direction that faces the inside of the housing when a horizontal is defined as 0 degrees, and a vertical direction is defined as 90 degrees or −90 degrees, and a second holding part disposed at an opposite end of the holding body and inserted into the inside of the housing while having an inclination angle of a negative value that is smaller than 0 degrees and larger than −90 degrees, and the first holding part and the second holding part may be symmetrical to each other vertically with respect to the horizontal direction.

In accordance with another aspect of the disclosure, a wearable electronic device is provided. The wearable electronic device includes a housing, and a strap connected to one side of the housing, the housing includes at least one strap connecting structure, in which the strap is coupled to at least a portion of an outside thereof, the at least one strap connecting structure includes a housing body, an opening formed to an outside of the housing body and into which a portion of the strap is inserted, a first holding recess formed in a first diagonal direction between an inward direction of the housing body from the opening and a vertical direction with respect to a horizontal direction, and a second holding recess formed in a second diagonal direction between the inward direction of the housing body from the opening and the vertical direction with respect to the horizontal direction and disposed to correspond to the first holding recess in the vertical direction, and the strap includes a strap body, a holding body connected to one side of the strap body, a first holding part protruding from one end of the holding body in an inward direction of the housing and inserted into the first holding recess, and a second holding part disposed at an opposite end of the holding body and inserted into the second holding recess.

As described above, various embodiments support various designs of an external appearance of a housing by making a strap connecting structure of the housing, to which a strap is connected, lower than an adjacent periphery of the housing.

Furthermore, various embodiments may support a more appealing design of an appearance of a housing by removing or minimizing a structure that protrudes to an outside of the housing.

In addition, various embodiments may provide a stable coupling state while facilitating coupling of a strap to a strap connecting structure of a housing.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
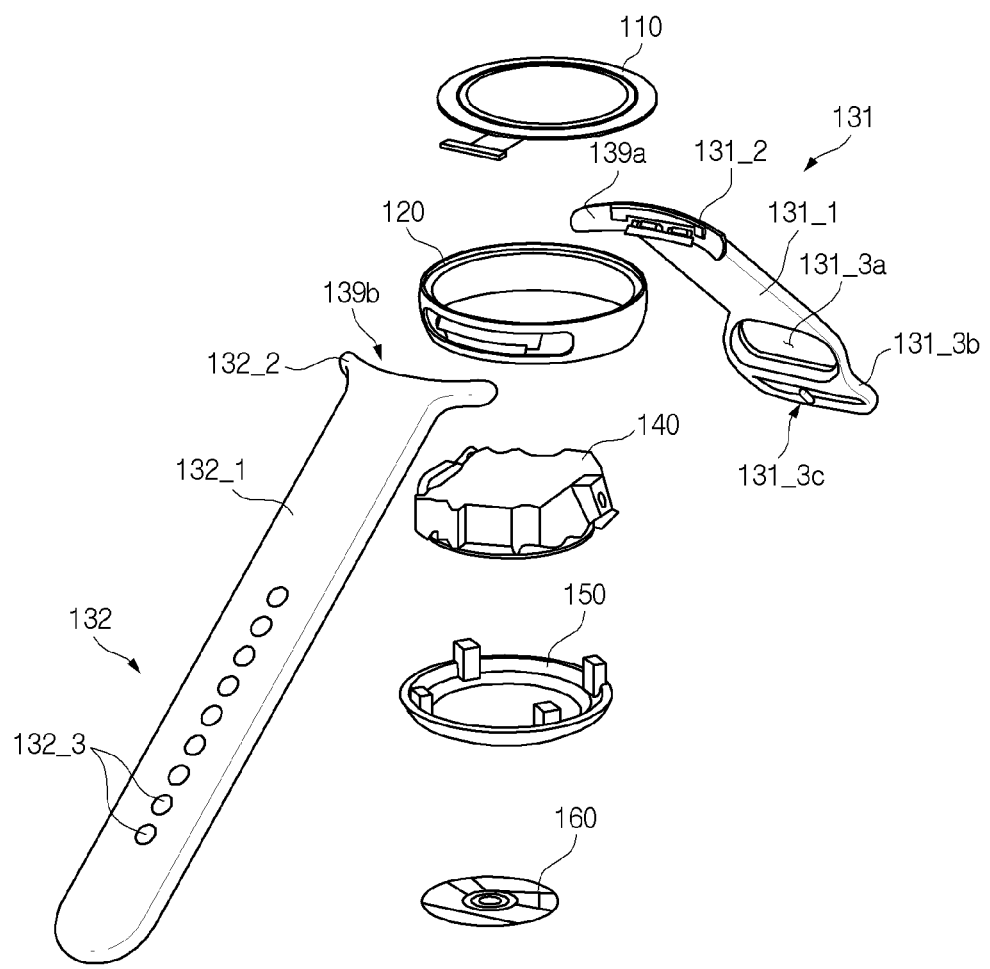
FIG. 1 is a view illustrating an example of an exploded perspective view of a wearable electronic device according to an embodiment of the disclosure.

FIG. 1 is a view illustrating an example of an exploded perspective view of a wearable electronic device according to an embodiment of the disclosure.

Referring to FIG. 1, a wearable electronic device 100 according to an embodiment of the disclosure may include body parts 110, 120, 140, 150, and 160 and straps 131 and 132.

The body parts 110, 120, 140, 150, and 160 may include the display 110, the housing 120, the electronic elements 140, the rear cover 150, and the rear layer 160. The electronic elements 140 may include a printed circuit board disposed inside the housing 120 and on which a processor, a memory, and the like related to driving of the display 110 are mounted, a battery that supplies electric power to the printed circuit board, a speaker that outputs audio signals, a microphone that collects audio signals, at least one physical button that generates input signals by input of a user, and at least one sensor. The electronic elements 140, such as the printed circuit board or the battery, may be seated inside the housing 120, and may not be observed from an outside when being covered by the display 110. At least a portion of the sensor, for example, is exposed through one side of the housing 120. In this regard, a sensor hole may be formed at an outer peripheral portion of the housing 120, at which the sensor is disposed, such that the sensor is exposed.

At least a portion of the display 110 may be exposed through an opening area provided in the housing 120, and the display 110 may output a specific functional screen in correspondence to control of the processor or control of a display driving circuit. The display 110, for example, includes an external protective member (e.g., a front cover, a window, or a window glass), a display panel, and a touch panel. Furthermore, the display 110 may further include a heat dissipating layer or an embossing layer that dissipates heat of the display panel or protects the display panel. Additionally, the wearable electronic device 100 may further include the display driving circuit (e.g., a display driver integrated circuit (IC)) related to driving of the display 110. The display driving circuit may be connected to the display panel including at least one pixel that outputs a screen and a flexible printed circuit board (FPCB). A periphery of the display 110 (or a display device), for example, may be circular. The display 110 may be seated on one side of the housing 120, and the periphery may be surrounded by an inner surface of the housing 120.

The housing 120, for example, has a ring shape including a hole, a center of which passes upwards and downwards. At least a portion of the housing 120 may be formed of a metallic material. According to various embodiments, at least a portion of the housing 120 may be formed of a nonmetallic material, and the partially metallic material separated by an area formed of the nonmetallic material may be used as an antenna. At least a portion of the display 110 may be disposed at an upper end of the housing 120 to be exposed to an outside. In this regard, a seating part, on which the display 110 may be seated and fixed, may be formed on one side of an upper end of the housing 120 to be stepped, and a bonding member may be disposed between the display 110 and the seating part. A central portion of an inner surface of the housing 120 may have a hollow cylindrical inner wall shape. At least a portion of an outer surface of the housing 120 may be formed to be convex. According to an embodiment, a central portion of the outer surface of the housing 120 may be formed to be more convex than an upper end and a lower end thereof. A strap connecting structure, to which the straps 131 and 132 may be connected, may be formed on the outer surface of the housing 120.

The electronic elements 140, for example, includes the printed circuit board, and the battery that supplies electric power to the printed circuit board and the display 110, and may include at least one of various input/output modules and sensors related to support of the functions of the wearable electronic device 100. The electronic elements 140 may be seated and disposed inside the housing 120. In this regard, external appearances of at least some of the electronic elements 140 may have a circular band shape or a coin shape. The display 110 may be disposed on an upper side of the electronic elements 140, and the rear cover 150 may be disposed on a lower side of the electronic elements 140.

The rear cover 150 may be coupled to the housing 120 in a forward direction from a rearward direction (e.g., an opposite direction to a direction, in which the display 110 is disposed, when the direction, in which the display 110 is disposed, is the forward direction of the housing 120) of the housing 120. The rear cover 150 may prevent movement of the electronic elements 140 disposed in the inside of the housing 120, in the housing 120. Furthermore, the rear cover 150 may prevent the electronic elements 140 disposed inside the housing 120 from being separated. The rear cover 150 may be seated on the seating part formed in the rearward direction of the housing 120. In relation to fixing of the rear cover 150, a bonding member or a coupling member (e.g., a screw) may be disposed between at least a partial area (e.g., a peripheral area of the rear cover 150 and an inner peripheral area of the housing 120) between the rear cover 150 and the housing 120. In this regard, the rear cover 150 may have a circular band shape, and at least one boss (protrusion, or hook) that may be coupled to the housing 120 may be disposed therein.

The rear layer 160 may be bonded or fixed to the rear surface (e.g., when the direction, in which the display 110 is disposed, is the forward direction, a surface in an opposite direction thereto) of the rear cover 150. At least a portion of the rear layer 160 may be formed of a nonmetallic material. At least a portion of a coil related to wireless charging, for example, is disposed in the rear layer 160. According to an embodiment, the coil may be disposed on a forward direction of the rear layer 160 that faces the rear cover 150. A bonding member may be disposed between the rear layer 160 and the rear cover 150, and the rear layer 160 may be bonded to the rear surface of the rear cover 150.

The straps 131 and 132 may be coupled to one side and an opposite side of the housing 120. For example, the straps 131 and 132 includes the first strap 131 (or a first strap structure) connected to one side of the housing 120, and the second strap 132 (or a second strap structure) connected to an opposite side of the housing 120. The first strap 131, for example, includes a strap short body 131_1, a body hole 131_3a, a buckle 131_3b, a hook 131_3c, a first strap coupling part 139a coupled to the housing 120, and a first strap fixing part 131_2, in which the first strap coupling part 139a is seated. At least a portion of the first strap fixing part 131_2 may be included in a portion of the strap short body 131_1.

The strap short body 131_1 may be formed of at least one of various materials, such as leather, rubber, or a metal member. The strap short body 131_1 may have a specific length and a width in a direction that becomes farther from the housing 120, and at least a portion thereof may include a flat shape. The buckle 131_3b connected to the strap short body 131_1 may include the body hole 131_3a, to which the second strap 132 may be connected. The body hole 131_3a, for example, has a width that is larger than a width of the second strap 132. The hook 131_3c may be disposed in the buckle 131_3b, and the hook 131_3c may be inserted into and coupled to hook holes 132_3 formed in the second strap 132. The first strap fixing part 131_2 may be formed on one side of the strap short body 131_1, and the first strap coupling part 139a may be fixed thereto. At least a portion of the first strap coupling part 139a may be coupled to the strap connecting structure formed in the housing 120. The first strap coupling part 139a may be formed of a material that is the same as or different from that of the first strap fixing part 131_2.

The second strap 132, for example, includes a strap long body 132_1, the hook holes 132_3, a second strap fixing part 132_2, and a second strap coupling part 139b. At least a portion of the second strap fixing part 132_2 may be included in a portion of the strap long body 132_1. The strap long body 132_1, for example, has a length that is larger than that of the strap short body 131_1. The strap long body 132_1 may have a thickness and a width that are the same as those of the strap short body 131_1. At least one of the hook holes 132_3 may be used for inserting the hook 131_3c in a process of coupling the second strap 132 to the first strap 131. The second strap fixing part 132_2 may be formed of a structure and a material that are the same as those of the above-described first strap fixing part 131_2. The second strap coupling part 139b may be formed of a structure and a material that are the same as those of the first strap coupling part 139a. Alternatively, according to various embodiments, at least one of various embodiments of the strap coupling part, which will be described below, may be applied to the first strap coupling part 139a and the second strap coupling part 139b in the same or different structures.

Figure 2:
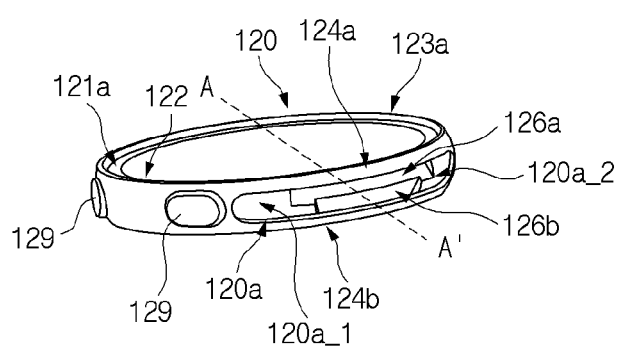
FIG. 2 is a view illustrating an example of a configuration of a housing of a wearable electronic device according to an embodiment of the disclosure.
Figure 2:
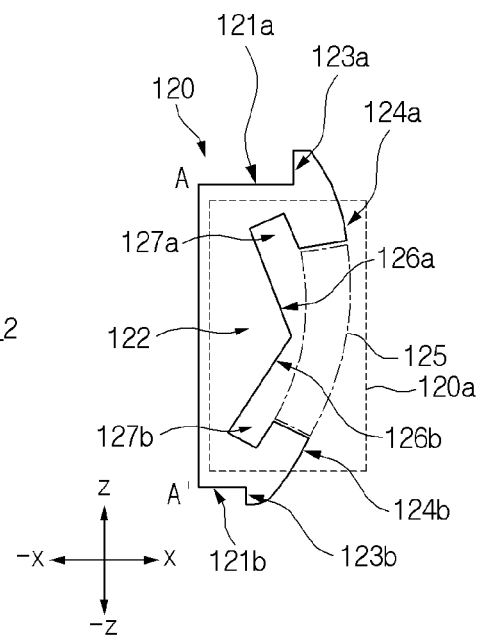

FIG. 2 is a view illustrating an example of a configuration of the housing of the wearable electronic device according to an embodiment of the disclosure. FIG. 2 is a view, in which state 201 is an example of a perspective view corresponding to an external appearance of the housing, and state 203 is an example of a cross-section taken along cutting line A-A' in state 201.

Referring to FIGS. 1 and 2, the housing 120 may include a housing body 122, at least one key button 129 formed on one side of the housing body 122, and a strap connecting structure 120a (or a strap connecting member or a strap connector, or a strap connection part), to which the straps 131 and 132 are coupled. Here, the strap connecting structure 120a may be changed according to the number of the straps connected to the housing 120. For example, as in FIG. 1, when two straps 131 and 132 are coupled to the housing 120, two strap connecting structures 120a are disposed in the housing 120.

The housing body 122 may have a ring shape, a central portion of which passes therethrough upwards and downwards, may have an inner side having a flat curved surface (e.g., being flat in the z axis direction and being circular in an xy plane), may have an outer side that is curved in the z axis direction, and may have a shape that is convex from a center of the housing in an outward direction. The strap connecting structure 120a may be disposed at, at least a portion of the outside of the housing body 122. When two strap connecting structures 120a are formed in the housing body 122, the two strap connecting structures 120a may be formed to be symmetrical to each other with respect to a center point of the housing body 122. A hole that passes through a side surface of the housing body 122 may be formed in the housing body 122 in an area, in which the at least one key button 129 is disposed, and the at least one key button 129 may be seated at, at least a portion of the corresponding hole.

A first seating part 121a and a front bezel 123a may be disposed on an upper side (e.g., the z axis) of the housing body 122. The first seating part 121a may be formed to be flat at an upper end of the housing body 122 in the z axis direction. According to an embodiment, at least a portion of the first seating part 121a and at least a portion of the housing body 122 may be disposed to be perpendicular to each other. The first seating part 121a may have a band shape, and at least a portion of an outskirt of the display 110 may be seated thereon. The bonding member may be disposed at, at least a portion between the first seating part 121a and the display 110. The front bezel 123a may be disposed to surround at least a portion of an outskirt of the first seating part 121a. The front bezel 123a may have a band shape along the first seating part 121a. According to an embodiment, the front bezel 123a may be formed to extend upwards (e.g., the z axis) from a periphery (e.g., a periphery in the x axis) of one side of the first seating part 121a by a specific height when defining a specific angle (e.g., a right angle) with the first seating part 121a. An outer side of the front bezel 123a may have a shape, a thickness of which gradually decreases as it goes from an upper side to a lower side.

A second seating part 121b and a rear bezel 123b may be disposed on a lower side (e.g., the −z axis) of the housing body 122. The second seating part 121b may be formed to be flat at a lower end of the housing body 122 in the −z axis direction. According to an embodiment, at least a portion of the second seating part 121b and at least a portion of the housing body 122 may be disposed to be perpendicular to each other. The second seating part 121b may have a band shape, and at least a portion of an outskirt of the rear cover 150 may be seated thereon. The bonding member may be disposed at, at least a portion between the second seating part 121b and the rear cover 150. The second seating part 121b may be formed to be symmetrical to the first seating part 121a in the z axis direction with respect to the xy plane at a center point of the housing body 122. The rear bezel 123b may be disposed to surround at least a portion of an outskirt of the second seating part 121b. The rear bezel 123b may have a band shape along the band-shaped second seating part 121b similarly to the front bezel 123a. The rear bezel 123b may be formed to be symmetrical to the front bezel 123a in the z axis direction with respect to the xy plane at the center point of the housing body 122.

At least one strap connecting structure 120a may be formed on one side of the outskirt of the housing body 122. According to an embodiment, at least a portion of the strap connecting structure 120a may include a recess shape that is recessed inwards from the outskirt of the housing body 122 by a specific depth. According to various embodiments, the strap connecting structure 120a may include an opening 125 (e.g., a recess part or a hole) of a specific depth formed at the outskirt of the housing body 122, and a first holding recess 127a and a second holding recess 127b that extend to the opening 125 with respect to the xy plane at the center point of the housing body 122, and is formed in an inward direction of the housing body 122 while having an inclination angle that is larger or smaller than 0 degrees in the z axis direction and the −z axis direction.

According to various embodiments, the first holding recess 127a may be disposed in a first diagonal direction (or a direction of a specific angle between an inward direction and a vertical direction) between an inward direction of the housing body 122 from the opening 125 and a vertical direction (e.g., among the vertical directions, an upward vertical direction or the z axis direction) corresponding to the z axis direction from the center of the housing body 122, with respect to a horizontal direction (or when the center of the ring shape housing body 122 is positioned on a flat surface to face an upper side, a direction that crosses the flat surface or a direction that is parallel to the flat surface). The second holding recess 127b may be disposed in a second diagonal direction between an inward direction of the housing body 122 from the opening 125 and a vertical direction (or, among the vertical directions, a downward vertical direction or the −z axis direction) with respect to the horizontal direction. The first diagonal direction and the second diagonal direction may be disposed to be symmetrical to each other upwards and downwards (or in a vertical direction) with respect to the horizontal direction.

The first holding recess 127a may include a first inclined surface 126a having an inclination angle (e.g., an angle between 180 degrees to 90 degrees) that is larger than a reference angle of 90 degrees in the z axis direction, in an inward direction, from the center point of the housing body 122, and a first holding hangover portion 124a (or a first holding hangover structure, or a boss or protrusion having a hangover shape) that defines the opening 125 (e.g., a recess), is spaced apart from the first inclined surface 126a by a specific interval, and protrudes in an opposite direction to the front bezel 123a. A shortest spacing distance between the first inclined surface 126a and the first holding hangover portion 124a may correspond to a thickness of the holding part of the inserted strap. The first inclined surface 126a may be disposed to be closer to the center of the housing body 122 than the first holding hangover portion 124a. A length of the first holding hangover portion 124a may be shorter than a length of the first inclined surface 126a. Cross-sectional shapes of the first inclined surface 126a and the first holding hangover portion 124a may have a hook shape. The opening 125 may be classified into a recess or a hole (opening) according to an observation direction. For example, when viewed from a lateral side of the housing body 122, the opening 125 is classified into a recess, and may be classified into a hole from a lateral side of the holding hangover portions 124a and 124b.

The second holding recess 127b, for example, includes a second inclined surface 126b having an inclination angle (e.g., an angle between 180 degrees and 90 degrees) that is smaller than −90 degrees with respect to the −z axis direction inwards from the center point of the housing body 122, and a second holding hangover portion 124b (or a hangover structure or a boss or a protrusion having a hangover shape) that defines the opening 125, is spaced apart from the second inclined surface 126b by a specific interval, and protrudes in an opposite direction to the rear bezel 123b. A shortest spacing distance between the second inclined surface 126b and the second holding hangover portion 124b may correspond to a thickness of the holding part of the inserted strap. The second holding recess 127b, for example, is formed to be symmetrical to each other upwards with respect to the center point of the housing body 122. The second inclined surface 126b may be formed to be symmetrical to each other upwards and downwards with respect to the center point of the housing body 122. The second inclined surface 126b may be disposed to be closer to the center of the housing body 122 than the second holding hangover portion 124b. A length of the second holding hangover portion 124b may be shorter than a length of the second inclined surface 126b. According to various embodiments, a protruding length of the second holding hangover portion 124b may be the same as a protruding length of the first holding hangover portion 124a. The cross-sectional shapes of the second inclined surface 126b and the second holding hangover portion 124b may be the same as or similar to the cross-sectional shapes of the first inclined surface 126a and the first holding hangover portion 124a.

According to various embodiments, the first inclined surface 126a and the second inclined surface 126b may be formed in a partial area of the strap connecting structure 120a. For example, the strap connecting structure 120a is formed on an outer surface of the housing body 122, and a length of the recess in a direction of the xy plane may be larger than a height of the recess in the z axis direction or the −z axis direction. A lower end (e.g., a periphery in the −z axis direction or a portion of a peripheral end in the −z axis direction) of the first inclined surface 126a and an upper end (e.g., a periphery in the z axis direction or a portion of a peripheral end in the z axis direction) of the second inclined surface 126b may be connected to each other.

The opening 125, the first inclined surface 126a, and the second inclined surface 126b, which have been described above, may be formed at a central portion of the strap connecting structure 120a, and recesses having a specific depth may be provided on opposite sides of the strap connecting structure 120a to be stepped. The stepped recesses may define strap contacting areas 120a_1 and 120a_2, which wing parts formed in the straps 131 and 132 contact.

Central portions (e.g., the first holding part and the second holding part, which will be described above) of the straps 131 and 132 may be coupled to a central portion (e.g., an area, in which the first inclined surface 126a and the second inclined surface 126b are formed, or an area, in which the first holding recess 127a and the second holding recess 127b are formed) of the strap connecting structure 120a, and wing parts of the straps 131 and 132 may be coupled to opposite sides of the strap connecting structure 120a to be coupled thereto. In the regard, a first wing seating part 120a_1 and a second wing seating part 120a_2 having a specific depth may be formed on opposite sides of portions of the strap connecting structure 120a, to which a first holding part 310 and a second holding part 200 of the first strap 131 are coupled. According to various embodiments, a protruding structure, such as a hook, or a recessed structure may be formed in the first holding recess 127a and the second holding recess 127b to increase a coupling force with the strap. The protruding structure, for example, includes a structure that protrudes from an inside (e.g., a periphery between the −x axis and the −z axis) of the first holding hangover portion 124a in an inward direction (e.g., a direction between the −x axis and the −z axis) of the housing 120. The recessed structure, for example, includes a structure that is recessed from an inner surface (e.g., a periphery between the −x axis and the −z axis) of the first holding hangover portion 124a in an outward direction (e.g., a direction between the −x axis and the z axis) of the housing 120. The protruding structure or the recessed structure also may be formed in the second holding hangover portion 124b in the same way. When the above-described protruding structure or recessed structure is formed in the first holding recess 127a and the second holding recess 127b, a shape (a shape of the holding parts 310 and 200 disposed in the strap coupling parts 139a and 139b) of the straps inserted into the housing 120 may have a shape corresponding to the protruding structure or the recessed structure. For example, the shapes (e.g., parts inserted into the holding recesses 127a and 127b) of specific portions of the holding parts 310 and 200 has a hook shape that is coupled to one side of the protruding structure or a hook shape that is inserted into the recessed structure.

Figure 3:
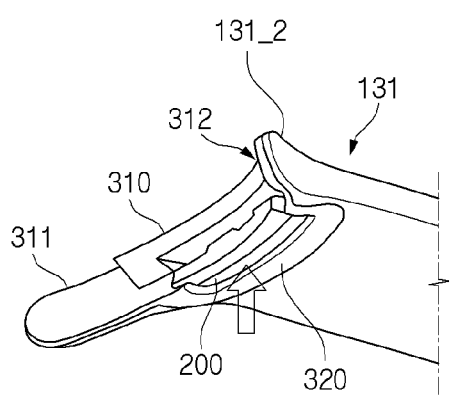
FIG. 3 is a view illustrating an example of a connection relationship of, among configurations of a wearable electronic device, a structure of a first strap and a housing according to an embodiment of the disclosure.
Figure 3:
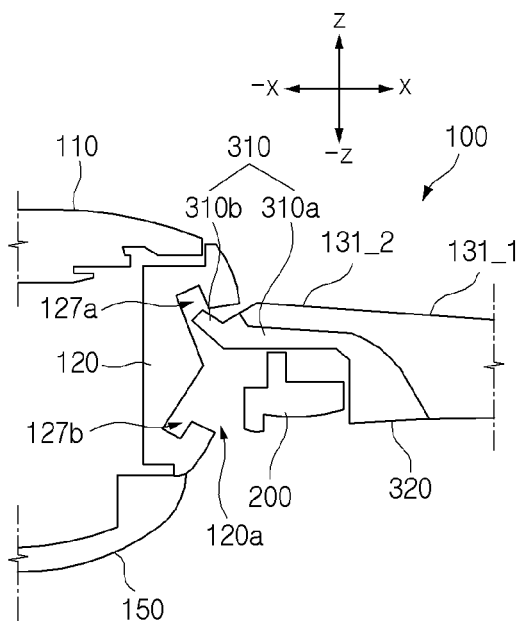
Figure 3:
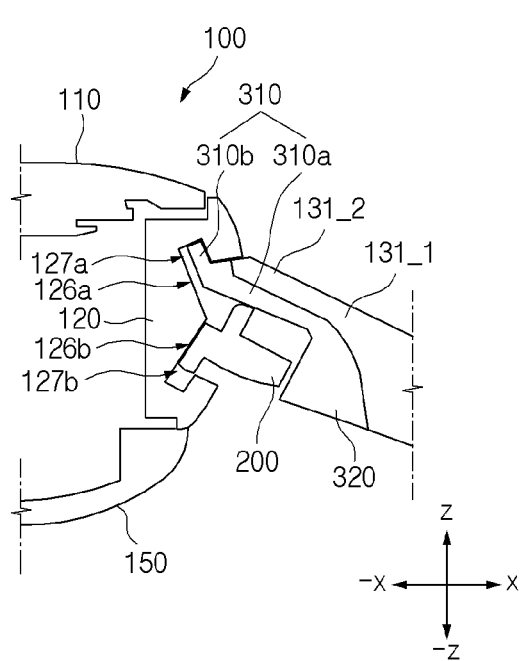
Figure 3:
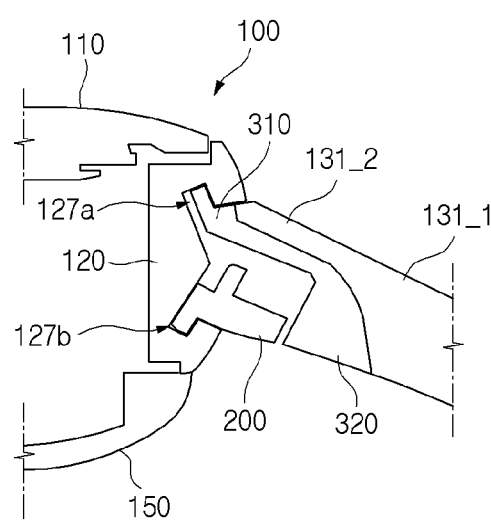

FIG. 3 is a view illustrating an example of a connection relationship of, among configurations of the wearable electronic device, the structure of the first strap and the housing according to an embodiment of the disclosure.

State 301 illustrates a direction of the first strap 131, in which an inside of the first strap coupling part 139a is observed, and state 303 illustrates a state, in which the first holding part 310 of the first strap 131 is inserted into the first holding recess 127a. State 305 illustrates a state (or a maximum movement state), in which the second holding part 200 is pressed to be moved by a specific distance in the xz axis direction while the first holding part 310 of the first strap 131 is inserted into the first holding recess 127a, and state 307 illustrates a state, in which the first holding part 310 of the first strap 131 is inserted into the first holding recess 127a and the second holding part 200 is inserted into the second holding recess 127b.

Referring to FIGS. 1 to 3, as in state 301, the first strap fixing part 131_2 may be disposed on one side (e.g., a periphery in the −x axis direction) of the first strap short body 131_1, and a holding body 320 may be fixed to the first strap fixing part 131_2. The first strap fixing part 131_2 may include a lower end part that defines a periphery of the first strap short body 131_1 in the −x axis direction, and an extension part that extends from an upper end of the first strap short body 131_1 in the −x axis direction and having a thickness that is smaller than that of the first strap short body 131_1. The holding body 320 may have a structure that is the same as or similar to that of the first strap fixing part 131_2. For example, the holding body 320 includes a lower end part that is fixed to a lower end part of the first strap fixing part 131_2 and supports the second holding part 200, and an upper end part that is disposed below the extension part of the first strap fixing part 131_2 and extends in the −x axis direction such that at least a portion thereof defines the first holding part 310. The first holding part 310 may include a basic base 310a that extends in the −x axis direction in the upper end part of the holding body 320, and a holding area 310b that extends from a periphery of the basic base 310a in a diagonal direction between the z axis and the −x axis. A size of the first holding recess 127a may be formed to be larger (or thicker) than a thickness of an end (e.g., the holding area 310b) of the first holding part 310. The first holding part 310 may be formed at, at least a portion of an upper side (e.g., the −z axis direction) of the holding body 320, and the second holding part 200 may be disposed at, at least a portion of a lower side (e.g., the −z axis direction) or a side surface (e.g., −x axis direction) thereof.

As in state 303, the display 110 may be seated on an upper side of the wearable electronic device 100, and the rear cover 150 may be coupled to a lower side of the housing 120. An empty space that passes through the housing 120 upwards and downwards may be formed at, at least a portion of an inside of the housing 120, and at least some of the above-mentioned electronic elements 140 may be disposed in the empty space of the inside of the housing 120. The first holding part 310 may include the basic base 310a that extends from the holding body 320, and the holding area 310b that extends from the basic base 310a and at least a portion of which is inserted into the first holding recess 127a. An entire shape of the first holding part 310 may have an "L" shape, of which left and right sides are reversed. The second holding part 200 may be formed as a separate structure to be coupled to one side of the holding body 320. For example, the second holding part 200 is moved in an upward/downward direction (e.g., the −z axis direction or the z axis direction) according to a pressure applied from an outside in the upward/downward direction after being coupling to a side surface of the holding body 320. The first holding part 310 may be disposed in a diagonal direction between the z axis and the −x axis in a state, in which the first strap short body 131_1 is disposed horizontally. The second holding part 200 may include a holding rail (or a holding boss) that faces the −z axis direction in a state, in which the first strap short body 131_1 is disposed horizontally. In a process of coupling the first strap 131 to the strap connecting structure 120a, the first holding part 310 may be inserted into the first holding recess 127a while being introduced through the opening 125 of the strap connecting structure 120a after the first strap short body 131_1 is positioned horizontally on one side of the housing 120. In this process, the second holding part 200 may be pressed and may be moved upwards (e.g., the z axis direction).

According to various embodiments, a size of the opening 125 may be formed to be smaller than a spacing distance between an upper end (e.g., an end of the holding area 310b) of the first holding part 310 and a lower end of the second holding part 200. According to various embodiments, in a state, in which the second holding part 200 is moved to an inside of the holding body 320 through pressing, a size of the opening 125 may be larger than a spacing distance between an upper end (e.g., an end of the holding area 310b) of the first holding part 310 and a lower end of the moved second holding part 200 (the second holding part 200 in a state, in which it is moved by a maximum distance, by which it may be moved in the z axis direction).

As in state 305, the first strap short body 131_1 is inclined to a right lower side (e.g., a diagonal line between the −z axis and the x axis), the first holding part 310 may be inserted into the first holding recess 127a, and in this process, the holding rail (or the holding boss) of the second holding part 200 may be disposed to contact one side of the second inclined surface 126b or to be parallel to the second inclined surface 126b. In this process, the first strap coupling part 139a may be inserted into the strap connecting structure 120a in a state, in which the spacing distance between the first holding part 310 and the second holding part 200 is made smaller by maintaining the pressing state of the second holding part 200.

As in state 307, when the pressure applied to the second holding part 200 is removed in a state, in which the second holding part 200 is disposed to be parallel to the second inclined surface 126b, the first holding part 310 may be inserted into the first holding recess 127a and the second holding part 120 may be inserted into the second holding recess 127b. When the strap short body 131_1 is coupled to the housing 120, the strap short body 131_1 may be held in a specific diagonal direction between the x axis and the −z axis, and correspondingly, the first holding part 310 may be disposed in a direction corresponding to the first inclined surface 126a and the second holding part 200 may be disposed in a direction corresponding to the second inclined surface 126b. According to an embodiment, with respect to a center point of the housing 120, the first holding part 310 may be disposed in a diagonal direction on an upper left side (between the z axis and the −x axis), and the second holding part 200 may be disposed in a diagonal direction on a lower left side (between the −z axis and the −x axis) and may be disposed to be symmetrical upwards and downwards with respect to the x axis or the −x axis. While the pressure applied to the second holding part 200 is removed, an interval between the first holding part 310 and the second holding part 200 may be formed to be larger than that of state 301. While the first strap 131 is seated on the strap connecting structure 120a, a first wing part 311 and a second wing part 312 disposed in the first strap 131 may be seated on the wing seating parts 120a_1 and 120a_2 formed in the strap connecting structure 120a.

Figure 4A:
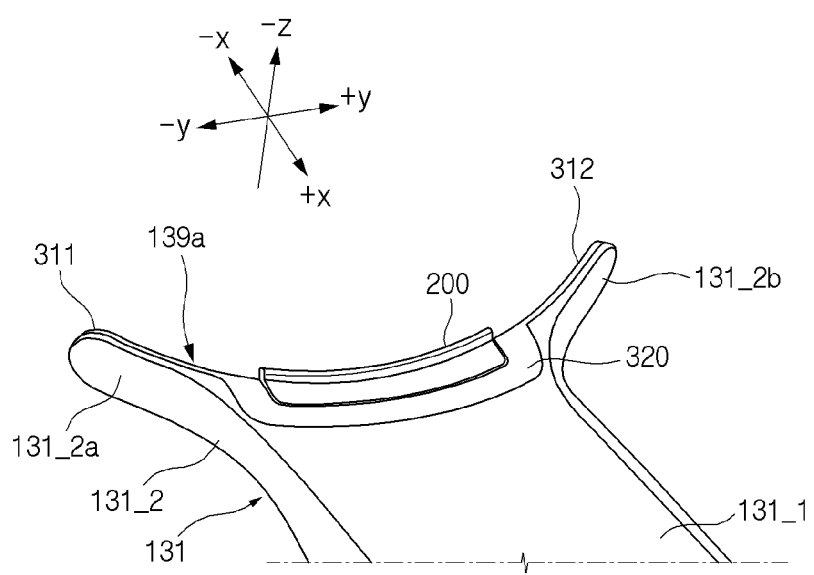
FIG. 4A is a view illustrating a state of observation of a first strap including a first strap coupling part in a first direction according to an embodiment of the disclosure.

FIG. 4A is a view illustrating a state of observation of the first strap including the first strap coupling part in a first direction according to an embodiment of the disclosure.

Figure 4B:
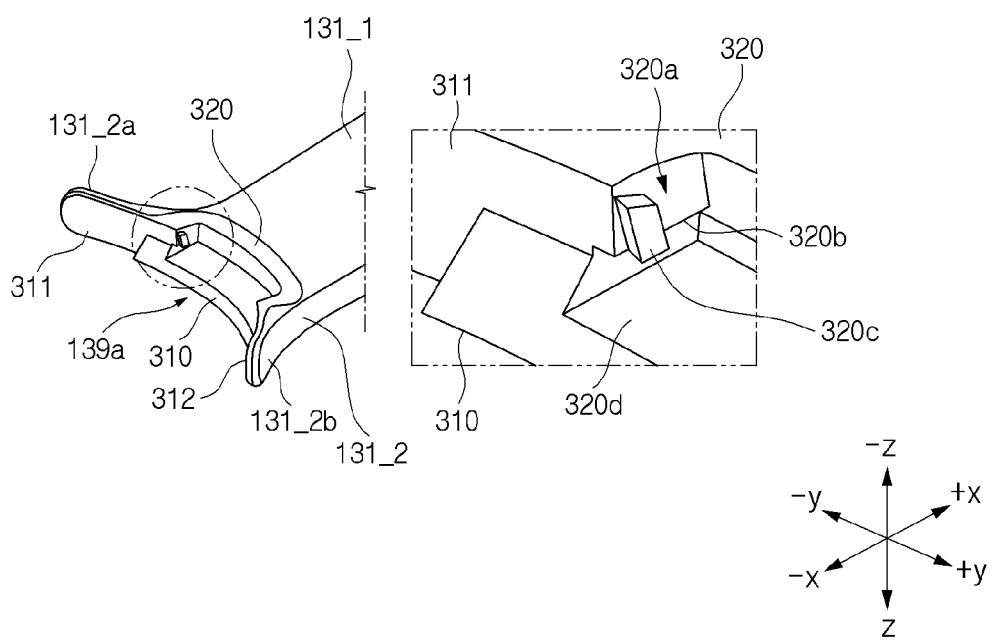
FIG. 4B is a view illustrating an example of a structure, in which a second holding part of a first strap including a first strap coupling part is removed, according to an embodiment of the disclosure.

FIG. 4B is a view illustrating an example of a structure, in which the second holding part of the first strap including the first strap coupling part is removed, according to an embodiment of the disclosure.

Figure 4C:
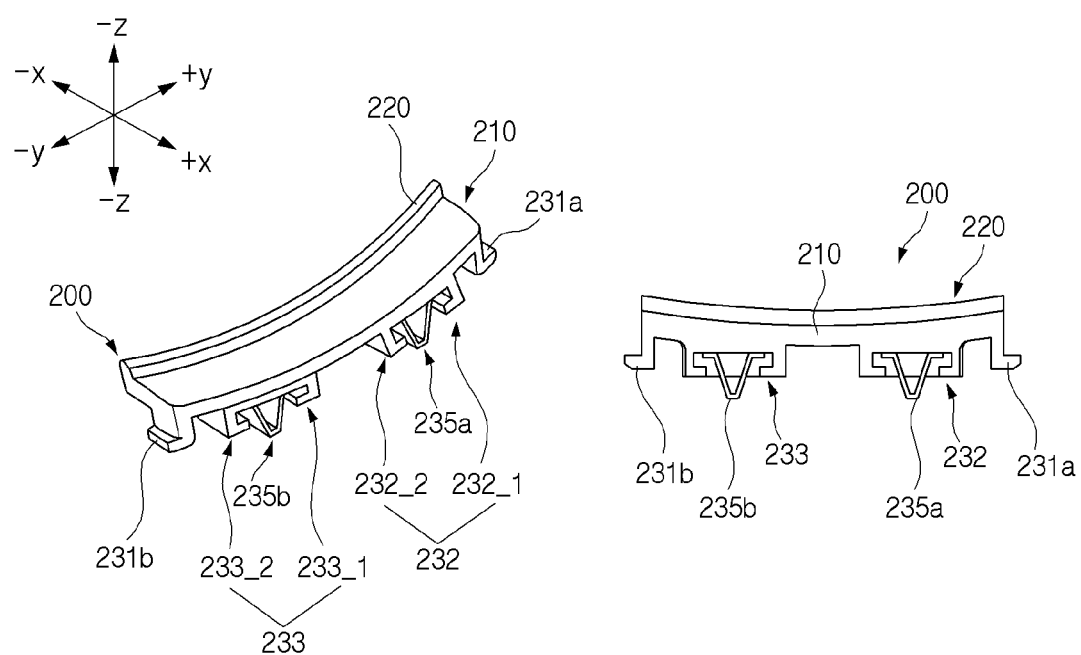
FIG. 4C is a view illustrating an example of a second holding part of a first strap including a first strap coupling part according to an embodiment of the disclosure.

FIG. 4C is a view illustrating an example of the second holding part of the first strap including the first strap coupling part according to an embodiment of the disclosure.

Figure 4D:
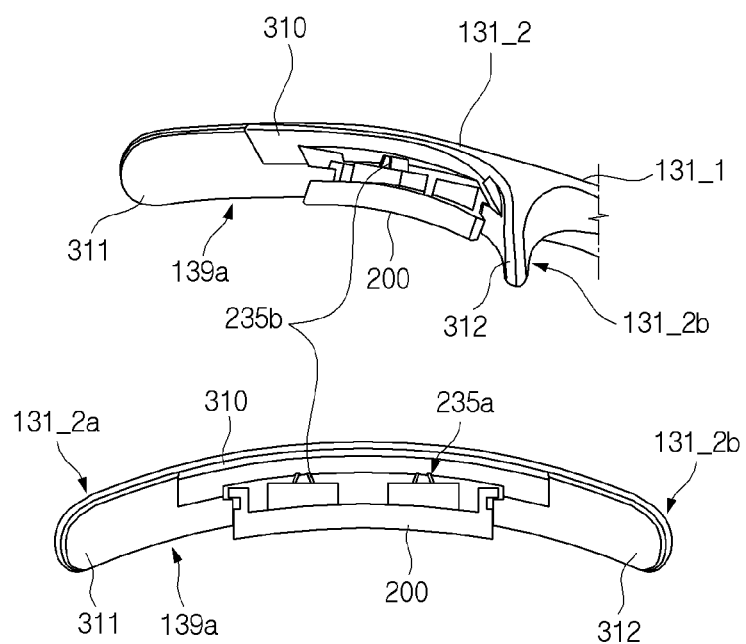
FIG. 4D is a view of observation of a structure of a first strap coupling part including a first holding part and a second holding part in a second direction according to an embodiment of the disclosure.

FIG. 4D is a view of observation of a structure of the first strap coupling part including the first holding part and the second holding part in a second direction according to an embodiment of the disclosure.

Referring to FIGS. 2, and 4A to 4D, referring to FIG. 4A, the first strap fixing part 131_2 may be disposed in the first strap 131 in the −x direction of the first strap short body 131_1, and the holding body 320 may be fixed to the first strap fixing part 131_2. According to an embodiment, the first strap fixing part 131_2 may be formed as a portion of the first strap short body 131_1. The first strap fixing part 131_2 and the holding body 320 may be formed of different materials. For example, the first strap fixing part 131_2 is formed of a flexible material, such as leather or a polymeric material, and the holding body 320 may be formed of a material having a rigidity that is higher than that of the first strap fixing part 131_2, for example, a plastic structure or a metal structure. The first strap fixing part 131_2 may include a space, in which the holding body 320 is seated, a first fixing part 131_2a coupled to the first wing part 311 of the first strap coupling part 139a, and a second fixing part 131_2b coupled to the second wing part 312. The first fixing part 131_2a may have a wing shape that extends from a center of the strap short body 131_1 in the x axis in the −y axis direction, and the second fixing part 131_2b may have a wing shape that extends from a center of the strap short body 131_1 in the x axis in the y axis direction. The first fixing part 131_2a may have a shape that is the same as or similar to that of the first wing part 311, may have a thickness that is similar to that of the first wing part 311, and may be disposed to cover a rear surface of the first wing part 311. The second fixing part 131_2b may have a shape that is the same as or similar to that of the second wing part 312, may have a thickness that is similar to that of the second wing part 312, and may be disposed to cover a rear surface of the second wing part 312. A bonding layer may be disposed between the first fixing part 131_2a and the first wing part 311 or between the second fixing part 131_2b and the second wing part 312.

According to various embodiments, a periphery of the first strap fixing part 131_2 in the −x axis direction may be disposed to cover at least a portion of an upper side (e.g., the z axis direction) of the first strap coupling part 139a. The first holding part 310 may protrude upwards (the z axis direction) further than peripheral structures (e.g., the first wing part 311 and the second wing part 312) with respect to the z axis direction. The second holding part 200 may protrude downwards (the −z axis direction) further than peripheral structures (e.g., the first wing part 311 and the second wing part 312) with respect to the −z axis direction.

Referring to FIG. 4B, the holding body 320 may provide a holding space 320a, in which the second holding part 200 may be seated. At least one fixing rib 320c and a holding step part 320b may be disposed in the holding space 320a such that the second holding part 200 is prevented from being separated from the holding space 320a after being seated. The fixing rib 320c may prevent the second holding part 200 from being separated from the holding space 320a in the −x axis direction after being mounted in the holding space 320a, and the holding step part 320b may prevent the second holding part 200 mounted in the holding space 320a from being separated in the −z axis direction. The holding body 320 may include a holding part bottom 320d that supports the second holding part 200. A part of the holding part bottom 320d, which extends in the −x axis direction, may define the first holding part 310. A size of the holding part bottom 320d may correspond to a size of the second holding part 200. According to various embodiments, a length of the first holding part 310 in the y axis (or the −y axis) may be larger than a length of the second holding part 200 in the y axis (or the −y axis).

Referring to FIGS. 4C and 4D, the second holding part 200 may include a first holding base 210, of which a thickness in the x axis is larger than a length thereof in the y axis and has a specific curvature between the y axis and the −y axis with respect to the z axis, a first holding boss 220 that is formed from a periphery (e.g., a periphery in the −x axis) of one side of the first holding base 210 in a first direction (e.g., −z axis direction), a first hook 231a and a second hook 231b formed in a second direction (e.g., the z axis direction) of the first holding base 210, and a first elastic fixing structure 232 and a second elastic fixing structure 233 formed between the first hook 231a and the second hook 231b. In the above description, two elastic fixing structure are exemplified, but the disclosure is not limited thereto. For example, the second holding part 200 has one elastic fixing structure or three or more elastic fixing structures.

The first holding base 210 may include a plate shape that has a thickness in the z axis direction, which is smaller than a thickness in the x axis direction, has a convex shape when viewed in the z axis direction, has a concave shape when viewed in the −z axis direction, and has a length in the y axis direction that is larger than a length in the x axis direction. The first holding boss 220 may have a height that is similar to a depth of the second holding recess 127b or is the same as the depth of the second holding recess 127b, and may be formed in the y axis (or the −y axis) along a periphery of the first holding base 210 in the −x axis direction.

The first hook 231a may be formed to protrude from a periphery of the first holding base 210 in the y axis, in the z axis direction, and a protrusion direction of the hook may be an outward direction (e.g., the y axis direction) of one side with respect to a center point of the first holding base 210. The first hook 231a, for example, is coupled to the holding step part 320b formed in the holding body 320. The second hook 231b may be formed to protrude from a periphery of the first holding base 210 in the −y axis, in the z axis direction, and a protrusion direction of the second hook 231b may be an outward direction (e.g., the −y axis direction) of an opposite side with respect to the center point of the first holding base 210. The second hook 231b may be coupled to the holding step part formed in an opposite direction to the holding step part 320b of the holding body 320, to which the first hook 231a is coupled.

The first elastic fixing structure 232 may include two fixing structures 232_1 and 232_2 that are formed to be close to the first hook 231a and are spaced apart from each other by a specific interval while facing each other, and a side wall that connects the two fixing structures 232_1 and 232_2 such that a mounted first elastic member 235a is not separated. The first elastic member 235a may be inserted and fixed between the two spaced fixing structures 232_1 and 232_2. The first elastic member 235a, for example, has a "V" shape. Upper ends (e.g., bifurcated parts) of the first elastic member 235a may be seated in and fixed to the first fixing structure 232_1 and the second fixing structure 232_2, respectively, and a lower end (e.g., a tip part) of the first elastic member 235a may be disposed to protrude in the z axis direction through a space between the two fixing structures 232_1 and 232_2. In this relation, a length of the first elastic member 235a in the z axis direction may be formed to be larger than extension lengths of the first fixing structure 232_1 and the second fixing structure 232_2 in the z axis direction. An included angle of the "V" shape of the first elastic member 235a becomes larger while a pressure is applied to the second holding part 200 from an outside, and a height thereof, which protrudes in the z axis direction may be reduced. The second holding part 200 may be moved in the z axis direction until opposite peripheries of the "V" shape of the first elastic member 235a contacts the side wall of the first fixing structure 232_1 and the side wall of the second fixing structure 232_2. When the pressure applied to the second holding part 200 is released, the first elastic member 235a may be disposed to recover a prior protrusion height to an opening of the upper end of the first elastic fixing structure 232, and correspondingly, the second holding part 200 may return in the z axis direction. A second elastic member 235b also may exert an elastic force while being operated in a way that is the same as or similar to that of the first elastic member 235a.

The second elastic fixing structure 233 may have a structure that is the same as or similar to that of the first elastic fixing structure 232. According to an embodiment, the second elastic fixing structure 233 may include a third fixing structure 233_1 and a fourth fixing structure 233_2 that are spaced apart from each other by a specific interval, a side wall that covers side surfaces of the third fixing structure 233_1 and the fourth fixing structure 233_2, and the second elastic member 235b that is inserted between the third fixing structure 233_1 and the fourth fixing structure 233_2, one side of which is fixed to the third fixing structure 233_1, an opposite side of which is fixed to the fourth fixing structure 233_2, and which protrudes in the z axis direction between the third fixing structure 233_1 and the fourth fixing structure 233_2. The second elastic fixing structure 233 may be disposed to be close to the second hook 231b. Alternatively, the second elastic fixing structure 233 may be disposed to be spaced apart from the first elastic fixing structure 232 by a specific interval. Accordingly, the second elastic fixing structure 233 may be disposed between the first elastic fixing structure 232 and the second hook 231b. In consideration of elasticity of the first holding base 210 of the second holding part 200, a spacing distance between the first elastic fixing structure 232 and the second elastic fixing structure 233 may be larger than an interval between the first hook 231a and the first elastic fixing structure 232 or an interval between the second hook 231b and the second elastic fixing structure 233. The second holding part 200 may be formed of a material that is the same as or similar to that of the first holding part 310 or the holding body 320, except for the elastic member.

Figure 5A:
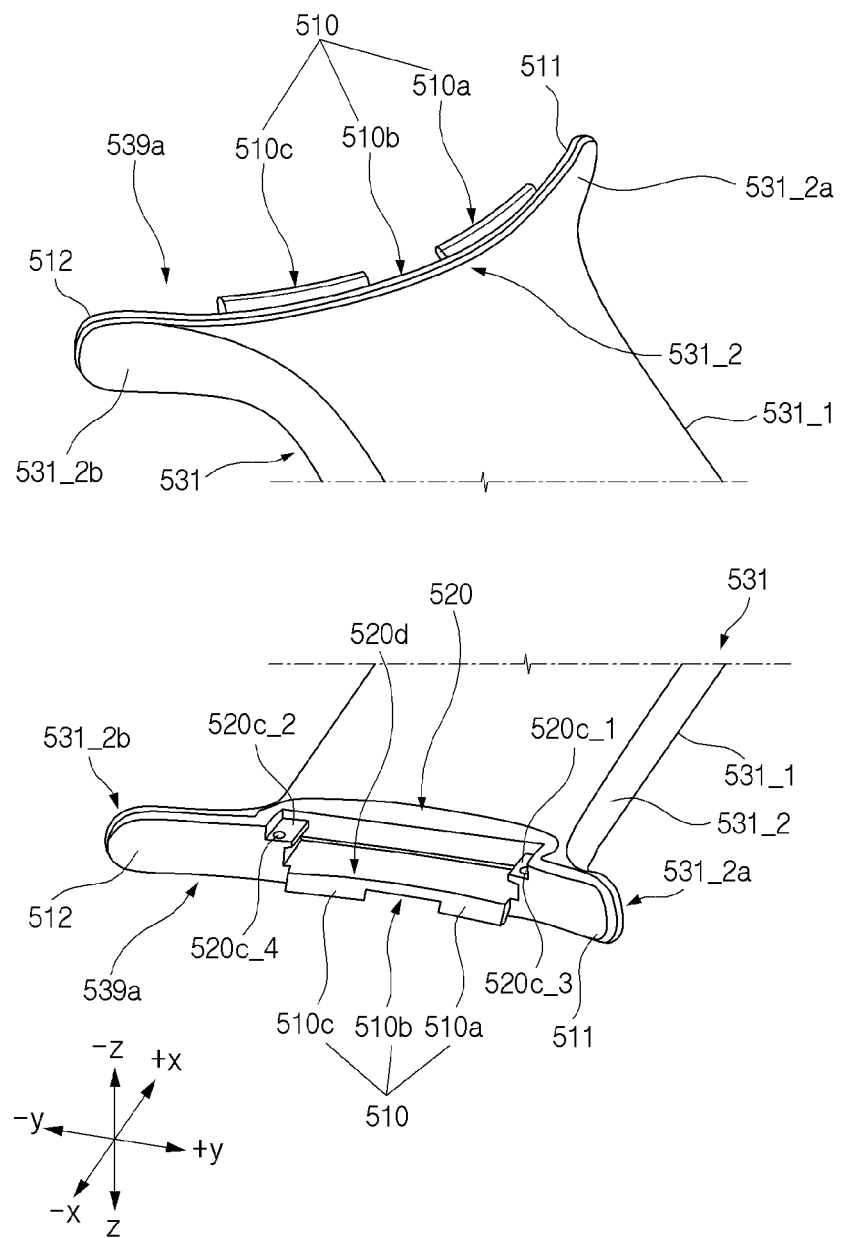
FIG. 5A is a view illustrating a state of observation of a partial structure of a strap in a first direction and a second direction according to an embodiment of the disclosure.

FIG. 5A is a view illustrating a state of observation of a partial structure of the strap in the first direction and the second direction according to an embodiment of the disclosure.

Figure 5B:
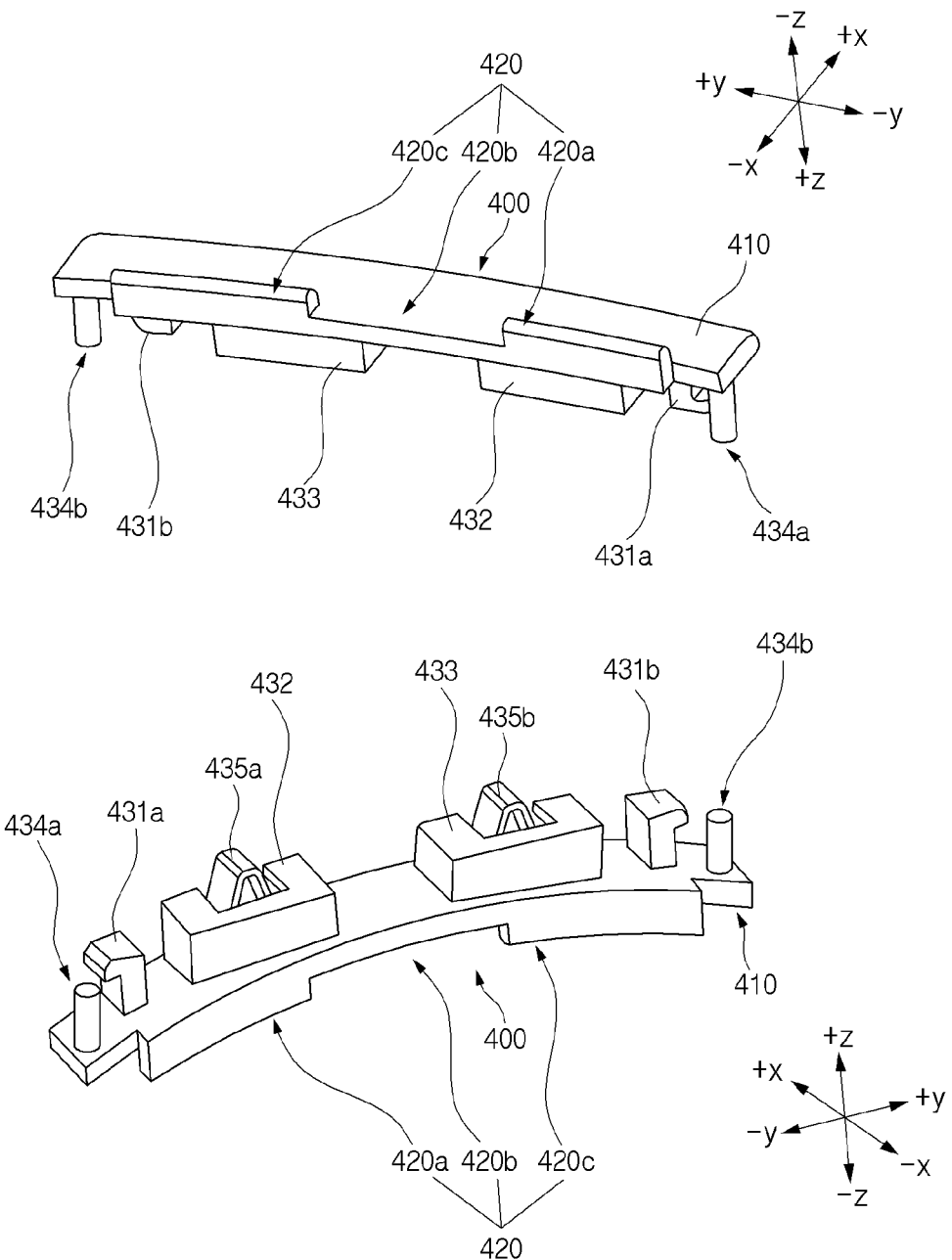
FIG. 5B is a view illustrating an example of a structure of a second holding part of a strap according to an embodiment of the disclosure.

FIG. 5B is a view illustrating an example of a structure of the second holding part of the strap according to an embodiment of the disclosure.

Figure 6:
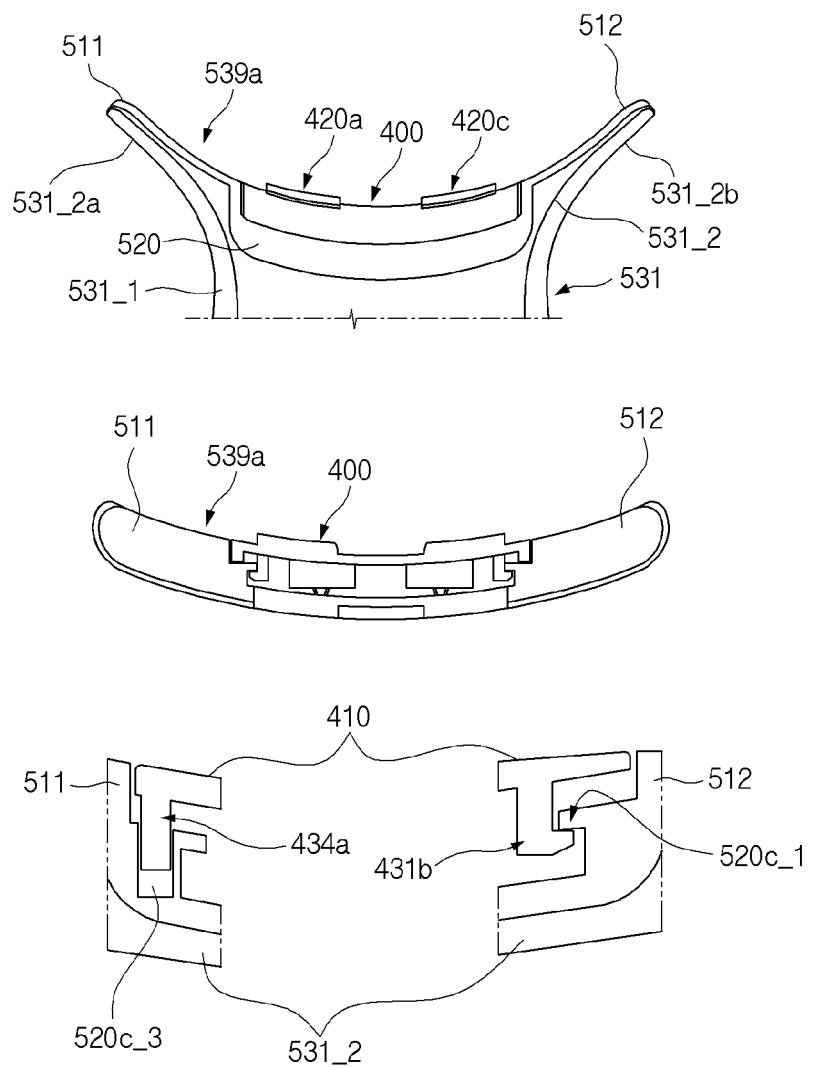
FIG. 6 is a view illustrating a coupling form of a second holding part of a structure of a strap according to an embodiment of the disclosure.

FIG. 6 is a view illustrating a coupling form of the second holding part of the structure of the strap according to an embodiment of the disclosure.

Referring to FIG. 5A, a third strap 531 according to the second embodiment may include a first strap body 531_1, a third strap fixing part 531_2, and a third strap coupling part 539a. At least a portion of the third strap fixing part 531_2 may be included in the first strap body 531_1.

The first strap body 531_1 may be at least one of the strap short body or the strap long body described above in FIGS. 1 to 3, and 4A to 4D. The third strap fixing part 531_2 and the third strap coupling part 539a fixed to the third strap fixing part 531_2 may be disposed on one side (e.g., a periphery in the −x axis) of the first strap body 531_1. The first strap body 531_1 may be formed of a material that is different from that of the third strap coupling part 539a. For example, the first strap body 531_1 is formed of a nonmetallic material, for example, such as leather, a polymeric material, urethane, or rubber, which has a low rigidity or flexible as compared with the third strap coupling part 539a.

The third strap fixing part 531_2 may be disposed at a periphery of the first strap body 531_1 in the −x axis. According to an embodiment, the third strap coupling part 539a may be fixed to the third strap fixing part 531_2. The third strap fixing part 531_2 may be formed of a structure and a material that are the same as those of the above-described first strap fixing part 131_2. The third strap fixing part 531_2 may include a seating area, to which a holding body 520 is seated to be fixed, and a third fixing part 531_2a and a fourth fixing part 531_2b disposed on opposite sides of the seating area.

The third strap coupling part 539a may be fixed by the third strap fixing part 531_2. The third strap coupling part 539a may be formed of a material that is different from that of the third strap fixing part 531_2. According to various embodiments, the third strap coupling part 539a may be formed of a rigid material (e.g., a plastic structure) having a relatively high rigidity as compared with the third strap fixing part 531_2. The third strap coupling part 539a may include the holding body 520, a third holding part 510 that extends from an upper side (e.g., an upper part in the z axis direction) of the holding body 520 in a specific diagonal direction between the −x axis and the z axis, a fourth holding part 400 that is coupled to the holding body 520, and a third wing part 511 and a fourth wing part 512 that are disposed on opposite sides of the holding body 520. The holding body 520 may be seated in and fixed to the seating area of the third strap fixing part 531_2. The third wing part 511 may have a shape that is the same as or similar to that of the third fixing part 531_2a. The fourth wing part 512 may have a shape that is the same as or similar to that of the fourth fixing part 531_2b.

The third holding part 510 may protrude from an upper side of the holding body 520 by a specific length in a diagonal direction between the −x axis and the z axis, and may be inserted into the first holding recess 127a of the housing 120. In this regard, the third holding part 510 may include a basic base (e.g., a part that overlaps the third strap fixing part 531_2 in the z axis direction) that is fixed to the third strap fixing part 531_2, a first holding area 510a and a second holding area 510c that extend from the basic base at a specific angle, and a first spacing recess 510b that is formed between the first holding area 510a and the second holding area 510c. The first holding area 510a and the second holding area 510c may have the same or similar sizes. The first spacing recess 510b may be used to prevent movement of the third strap 531 by reducing a spacing space between the third strap 531 and the strap connecting structure of the housing 120.

A holding space 520a may be formed by the holding body 520 that is stepped in the z axis direction. According to an embodiment, the holding body 520 that defines the holding space 520a may include a holding part bottom 520d that defines a bottom surface connected to the third holding part 510, a first holding step 520c_1 and a second holding step 520c_2, at least portions of which are extracted from opposite peripheries (e.g., peripheries in the y axis and the −y axis) of the holding part bottom 520d to an inside of the holding space 520a, a first guide groove 520c_3 formed in the first holding step 520c_1 and punched in the z axis direction, and a second guide groove 520c_4 formed in the second holding step 520c_2 and punched in the z axis direction. The first holding step 520c_1 and the second holding step 520c_2 may include steps that are disposed at opposite peripheries of the holding body 520 and protrude in a direction of a central portion of the holding space 520a with respect to the central portion of the holding space 520a. The elastic member formed in the fourth holding part 400 may be disposed to contact the holding part bottom 520d may be disposed in the holding part bottom 520d, and hooks of the fourth holding part 400 may be coupled to the holding steps 520c_1 and 520c_2.

Referring to FIG. 5B, the fourth holding part 400 may be mounted on the holding space 520a defined by the holding body 520 described in FIG. 5A. The fourth holding part 400 may return in the −z axis direction due to the elasticity after being moved in the z axis direction by the pressure applied in the z axis direction. In this regard, the fourth holding part 400 may include a second holding base 410, a second holding boss 420 (or a holding rail), a third hook 431a, a fourth hook 431b, a third elastic fixing structure 432, a fourth elastic fixing structure 433, a first guide boss 434a, and a second guide boss 434b.

The second holding base 410, for example, has a shape, at least a portion of which is convex in the −z axis direction, and may have a panel shape, of which a length in the y axis (or the −y axis) is larger than a length in the x axis direction. The second holding boss 420 that extends by a specific height in a direction (e.g., the −z axis direction) that is perpendicular to an upper surface of the second holding base 410 may be disposed at a periphery (e.g., a periphery in the −x axis direction) of one side of the second holding base 410.

The second holding boss 420, for example, includes a first holding rail 420a, a second holding rail 420c, and a second spacing recess 420b. The first holding rail 420a, for example, is disposed at a location corresponding to the first holding area 510a of the third holding part 510, and the second holding rail 420c may be disposed at a location corresponding to the second holding area 510c of the third holding part 510. The second spacing recess 420b, for example, is disposed at a location corresponding to the first spacing recess 510b of the third holding part 510. According to various embodiments, the first spacing recess 510b and the second spacing recess 420b may have the same or similar sizes. The first holding rail 420a and the second holding rail 420c may be inserted into the second holding recess 127b, respectively.

The third hook 431a may be formed to a rear surface (e.g., the z axis direction) of the second holding base 410 and may be disposed to be inclined to a periphery thereof in the y axis. The third hook 431a may be disposed to protrude in the y axis direction. The fourth hook 431b may be formed to a rear surface (e.g., the z axis direction) of the second holding base 410 and may be disposed to be inclined to a periphery thereof in the −y axis. The fourth hook 431b may be disposed to protrude in the −y axis direction. The third hook 431a and the fourth hook 431b, for example, is disposed to be symmetrical to each other in the y axis and −y axis directions with respect to the second spacing recess 420b. The third hook 431a may be coupled to the first holding step 520c_1 described above, and the fourth hook 431b may be coupled to the second holding step 520c_2.

The third elastic fixing structure 432 may include a pair of hooks that face each other, and a side wall that closes side surfaces (e.g., side surfaces in the −x axis direction) of the pair of hooks. The third elastic fixing structure 432 may include an opening that is opened in the x axis direction, and an opening on an upper side (e.g., the −z axis direction) that is defined as the pair of hooks are spaced apart from each other. Similarly or in the same way, the fourth elastic fixing structure 433 may include a pair of hooks that face each other, and a side wall that closes side surfaces (e.g., side surfaces in the −x axis direction) of the pair of hooks. The fourth elastic fixing structure 433 may include an opening that is opened in the x axis direction, and an opening on an upper side (e.g., the −z axis direction) that is defined as the pair of hooks are spaced apart from each other. The third elastic fixing structure 432 and the fourth elastic fixing structure 433 may be disposed to be symmetrical to each other in the y axis direction and the −y axis direction with respect to a center of the second spacing recess 420b. The third elastic fixing structure 432 and the fourth elastic fixing structure 433 may be formed on the rear surface (e.g., the z axis direction) of the second holding base 410.

The first guide boss 434a may be disposed at a periphery of the second holding base 410, which is adjacent to the third hook 431a. The first guide boss 434a may protrude in a rearward direction of the second holding base 410 and may have a cylindrical shape. At least a portion of the first guide boss 434a, for example, is seated in the first guide groove 520c_3. The second guide boss 434b may be formed at a periphery of the second holding base 410, which is adjacent to the fourth hook 431b, may protrude in a rearward direction of the second holding base 410, and may have a cylindrical shape. At least a portion of the second guide boss 434b, for example, is seated in the second guide groove 520c_4. The first guide boss 434a and the second guide boss 434b may be disposed to be symmetrical to each other in the y axis direction and the −y axis direction with respect to a center of the second spacing recess 420b.

A third elastic member 435a, for example, has a "V" shape, and may be mounted on the third elastic fixing structure 432. At least a portion, for example, a corner of the third elastic member 435a is disposed to protrude in the z axis direction through an opening of one side of the third elastic fixing structure 432. The third elastic member 435a may be disposed to contact the holding part bottom 520d. A fourth elastic member 435b may have the same structure as that of the third elastic member 435a, for example, the "V" shape, and is mounted on the fourth elastic fixing structure 433. At least a portion, for example, a corner of the fourth elastic member 435b is disposed to protrude in the z axis direction through an opening of one side of the fourth elastic fixing structure 433. The fourth elastic member 435b may be disposed to contact the holding part bottom 520d.

Referring to FIG. 6, the third strap 531 may include the first strap body 531_1, the third strap fixing part 531_2 formed at a periphery of the first strap body 531_1 in the −x axis direction, and the third strap coupling part 539a fixed to the third strap fixing part 531_2. The third strap coupling part 539a, as described above, may include the third holding part 510 that extends from a portion (e.g., an upper corner in the z axis direction) of the holding body 520, and the fourth holding part 400, at least a portion of which faces the third holding part 510. At least a portion of the first guide boss 434a of the fourth holding part 400, which protrudes from the second holding base 410 in the z axis direction, may be inserted into a second guide groove 520_3c formed in the holding body 520, and may guide the fourth holding part 400 such that the fourth holding part 400 is prevented from being separated (e.g., separated in the −x axis direction and the z axis direction) from the holding body 520 while the fourth holding part 400 is moved upwards and downward in the z axis direction. In the same way, at least a portion of the second guide boss 434b may be inserted into the second guide groove 520c_2, and may guide the fourth holding part 400 as in the first guide boss 434a. The fourth hook 431b formed in the z axis direction from the second holding base 410 may be hooked to the second holding step 520c_2 formed in the holding body 520. Similarly, the third hook 431a may be hooked to the first holding step 520c_1 formed in the holding body 520 to prevent the fourth holding part 400 from separated from the holding body 520 in the z axis direction.

Figure 7:
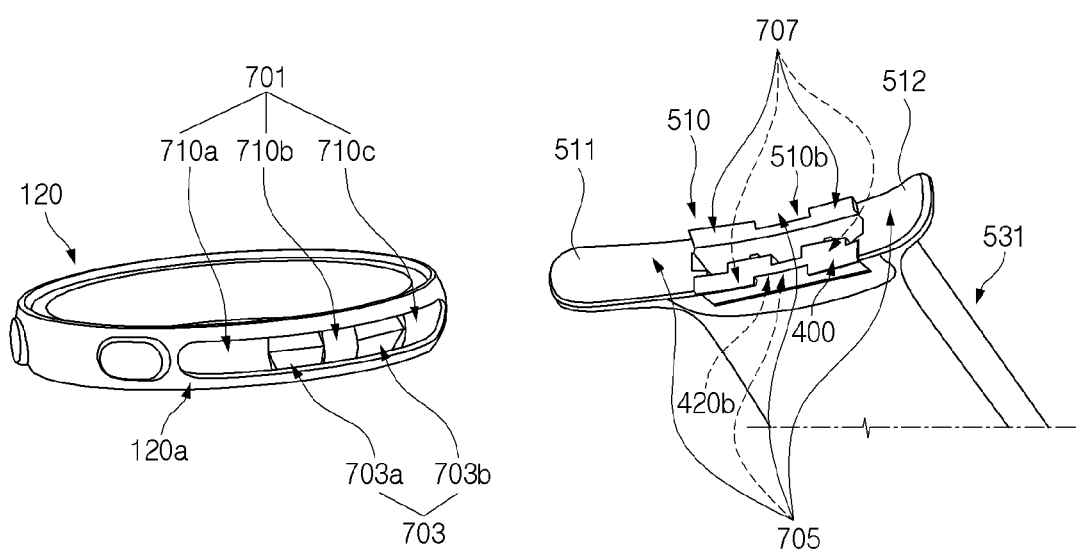
FIG. 7 is a view illustrating an example of a coupling structure of a strap and a housing according to an embodiment of the disclosure.

FIG. 7 is a view illustrating an example of a coupling structure of the strap and the housing according to an embodiment of the disclosure.

Figure 8:
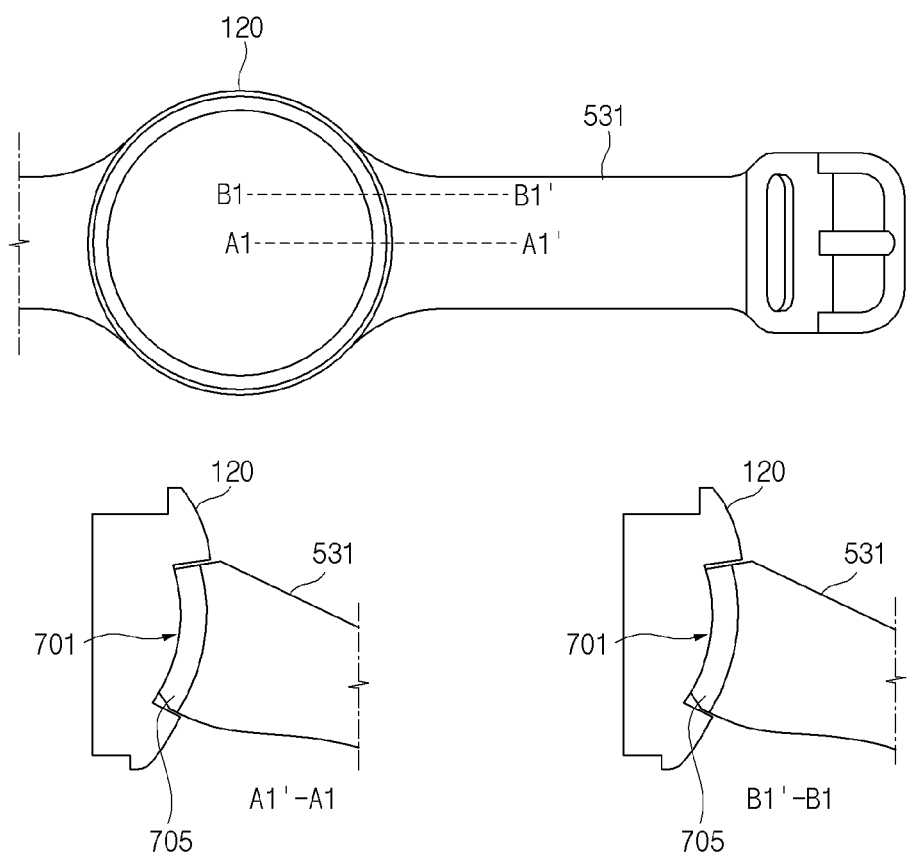
FIG. 8 is a view illustrating a cross-section of a coupling structure of a strap and a housing according to an embodiment of the disclosure.

FIG. 8 is a view illustrating a cross-section of the coupling structure of the strap and the housing according to an embodiment of the disclosure.

Referring to FIGS. 5A, 5B, 6, and 7, the third strap 531 may include the third holding part 510, in which the first spacing recess 510b is formed, and the fourth holding part 400, in which the second spacing recess 420b is formed. Referring to FIG. 5A described above, the third holding part 510 may include the first holding area 510a and the second holding area 510c on opposite sides with respect to the first spacing recess 510b. The fourth holding part 400 may include the first holding rail 420a and the second holding rail 420c on opposite sides with respect to the second spacing recess 420b.

The housing 120 may include at least one strap connecting structure 120a on a side thereof. The strap connecting structure 120a, for example, includes a strap contact area 701 and an inclined surface area 703. The strap contact area 701 may include a recess area that is lower than (engraved from) a periphery thereof. According to various embodiments, the strap contact area 701 may include a first strap contact area 710c, in which the third wing part 511 is seated, a second strap contact area 710a, in which the fourth wing part 512 is seated, a third strap contact area 710c, which a portion (e.g., a peripheral portion of an area, in which the first spacing recess 510b is formed) of the third holding part 510 and a portion (e.g., a peripheral portion of an area, in which the second spacing recess 420b is formed) of the fourth holding part 400 contact.

The inclined surface area 703 may include a specific inclined surface that is formed upwards and downwards with respect to a center of a side part of the housing 120, and the holding hangover portions may be formed on upper and lower sides thereof such that some configurations (e.g., the holding areas and the holding rails) of the third holding part 510 and the fourth holding part 400 may be mounted thereon. The inclined surface area 703, for example, includes a first inclined surface area 703a and a second inclined surface area 703b that are divided by the strap contact areas 710a, 710b, and 710c. The first holding area 510a of the third holding part 510 and the first holding rail 420a of the fourth holding part 400, for example, are disposed to be adjacent to the first inclined surface area 703a. The second holding area 510c of the third holding part 510 and the second holding rail 420c of the fourth holding part 400, for example, is disposed to be adjacent to the second inclined surface area 703b.

A housing contact area 705 of the third strap 531 may contact the strap contact area 701 of the housing 120. The housing contact area 705 of the third strap 531 may include the third holding part 510 and the fourth holding part 400 including the third wing part 511, the fourth wing part 512, the first spacing recess 510b, and the second spacing recess 420b. An inclined surface contact area 707 of the third strap 531 may contact the inclined surface area 703 of the housing 120. The inclined surface contact area 707 of the third strap 531 may include the holding areas 510a and 510c of the third holding part 510 and the holding rails (e.g., 420a and 420c) of the fourth holding part 400.

Referring to FIG. 8, as in cross-sections A1-A1' and B1-Ba' of areas, in which the strap contact areas 701 and the housing contact areas 705 contact each other, the strap contact area 701 and the housing contact area 705 may closely contact each other (or a movement space is removed) to prevent movement of the third strap 531.

The structure of the strap coupling part of the third strap according to the above-described second embodiment may be applied to at least one of the straps described above in FIGS. 1 to 3, and 4A to 4D. Alternatively, the strap of one of the strap structures described in FIGS. 1 to 3, and 4A to 4D may be replaced to be applied.

Figure 9:
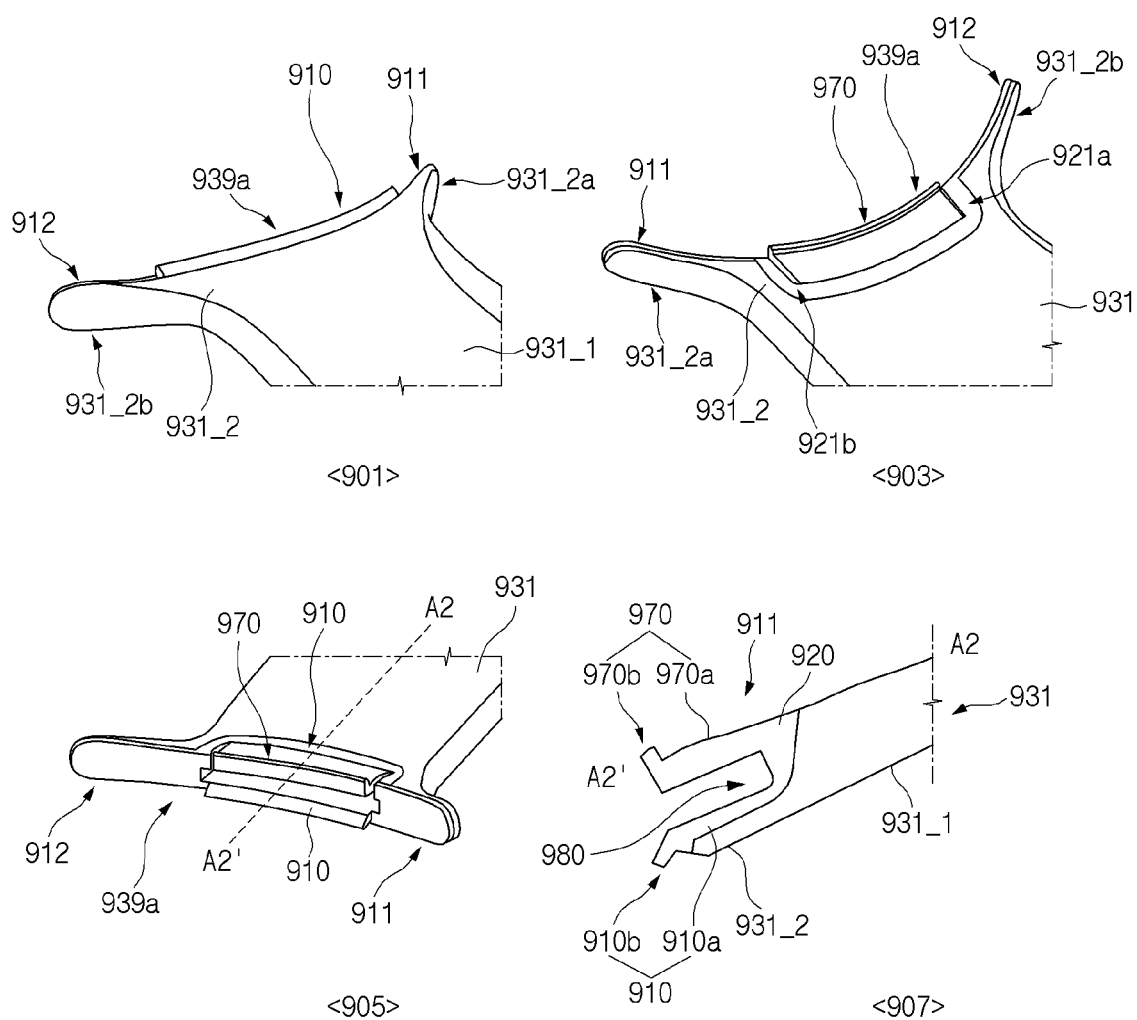
FIG. 9 is a view illustrating an example of a structure of a strap according to an embodiment of the disclosure.

FIG. 9 is a view illustrating an example of a structure of a strap according to an embodiment of the disclosure.

Referring to FIG. 9, state 901 is an observation state of a fourth strap 931 in a first direction, state 903 is an observation state of the fourth strap 931 in a second direction, state 905 is an observation state of the fourth strap 931 in a third direction, and state 907 illustrates an example of cutting cross-section of A2-A2' in state 905.

Referring to FIG. 9, according to an embodiment, the fourth strap 931 may include a second strap body 931_1, a fourth strap fixing part 931_2, and a fourth strap coupling part 939a. At least a portion of the fourth strap fixing part 931_2 may correspond to a portion of the second strap body 931_1. The second strap body 931_1 may correspond to at least one of the strap short body 131_1 of the first strap 131 and the strap long body 132_1 of the second strap 132 descried above in FIGS. 1 to 3, 4A to 4D, 5A, 5B, and 6. The fourth strap fixing part 931_2 may be disposed at a periphery of the second strap body 931_1 in the -x axis direction. The fourth strap fixing part 931_2 may fix at least a portion of the fourth strap coupling part 939a. The fourth strap fixing part 931_2 may include a structure that is the same as or similar to that of the first strap fixing part 131_2 described above in FIGS. 1 to 3, 4A to 4D, 5A, 5B, and 6. The fourth strap fixing part 931_2 may include a seating area, in which a holding body 920 is disposed, and a fifth fixing part 931_2a and a sixth fixing part 931_2b that are disposed on opposite sides with respect to the seating area.

The fourth strap coupling part 939a may include the holding body 920 disposed in the seating area of the second strap body 931_1, a fifth holding part 910 that extends from an upper side (e.g., the z axis direction) of the holding body 920 in the -x axis direction, a sixth holding part 970 that extends from a lower side (e.g., the -z axis direction) of the holding body 920 in the -x axis direction, a first wing part 911 that extends from a periphery of one side of the holding body 920 in a diagonal direction between the y axis and the -x axis, and a second wing part 912 that extends from a periphery of an opposite side of the holding body 920 in a diagonal direction between the -y axis and the -x axis.

The first wing part 911 may have a shape and a disposition state that are the same as or similar to those of the fifth fixing part 931_2a. According to an embodiment, a bonding layer may be disposed between the first wing part 911 and the fifth fixing part 931_2a. The second wing part 912 may have a shape and a disposition state that are the same as or similar to those of the sixth fixing part 931_2b. According to an embodiment, a bonding layer may be disposed between the second wing part 912 and the sixth fixing part 931_2b. The first wing part 911 may be disposed to be symmetrical to the second wing part 912 with respect to a central portion of the holding body 920. The first wing part 911 and the second wing part 912 may have a shape that is curved while having a specific curvature in the y axis and -y axis directions, and may have a concave shape when viewed from the -x axis. The first wing part 911 and the second wing part 912 having the concave shape may contact the strap contact area of the housing 120.

The fifth holding part 910 may include a first basic base 910a that extends from an upper side (e.g., an end in the z axis direction) of the holding body 920 in the -x axis direction, and a holding area 910b that extends from an end of an extension part of the first basic base 910a in the z axis direction or a diagonal direction between the -x axis and the z axis and contacts the inclined surface area of the housing 120. The fifth holding part 910 may be disposed to be spaced apart from the sixth holding part 970 by a specific distance.

The sixth holding part 970 may include a second basic base 970a that extends from a lower side (e.g., an end in the -z axis direction) of the holding body 920 in the -x axis direction while being spaced apart from the fifth holding part 910, and a holding rail 970b that extends from an end of an extension part of the second basic base 970a in the -x axis direction in a diagonal direction between the -x axis direction and the -z axis direction. According to various embodiments, the second basic base 970a may be disposed to be spaced apart from the fifth holding part 910 at an opposite side to one side of the holding body 920, in which the fifth holding part 910 is formed, and extend in a direction of the housing body 122, and the holding rail 970b may be formed to face the housing body 122 from an end of the second basic base 970a while having a specific inclination angle. Slits 921a and 921b may be formed between the sixth holding part 970 and the holding body 920. The slits 921a and 921b may help the sixth holding part 970 be moved inwards (e.g., the z axis direction) by eliminating interferences with the holding body 920.

The holding rail 970b and the holding area 910b may be disposed to be symmetrical to each other with respect to the x axis or the -x axis. A spacing distance between the fifth holding part 910 and the sixth holding part 970 may be changed when the sixth holding part 970 is deflected according to a pressure applied from an outside. For example, while the pressure is applied from the outside, the spacing distance between the fifth holding part 910 and the sixth holding part 970 becomes shorter, and when the supply of the pressure is released, the spacing distance between the fifth holding part 910 and the sixth holding part 970 may return to the specific interval.

Figure 10:
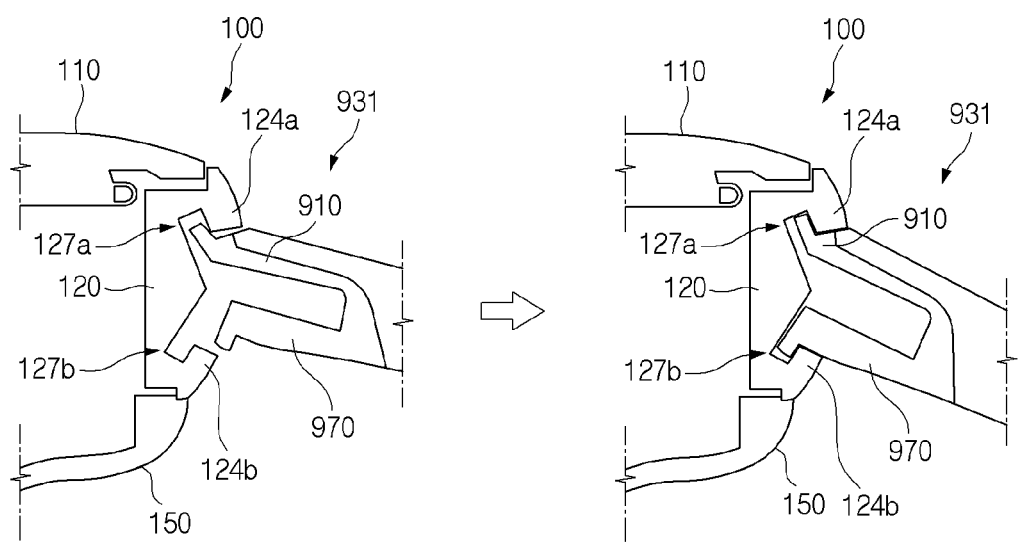
FIG. 10 is a view illustrating an example of coupling of a strap according to an embodiment of the disclosure.

FIG. 10 is a view illustrating an example of coupling of a strap according to an embodiment of the disclosure.

Referring to FIGS. 9 and 10, according to an embodiment, the wearable electronic device 100 may include the display 110, the housing 120, the rear cover 150, and the fourth strap 931. The fourth strap 931 may replace at least one of the first strap 131 or the second strap 132 that has been described above in FIG. 1. The fourth strap 931 may extend in the −x axis direction while the fifth holding part 910 and the sixth holding part 970 are integrally formed in the holding body 920 and the fifth holding part 910 and the sixth holding part 970 are spaced apart from each other. The display 110, the housing 120, and the rear cover 150 may have a structure that is the same as the structure that has been described above in FIGS. 1 and 2. In the housing 120, for example, the first holding recess 127a and the second holding recess 127b are disposed to be symmetrical in an upward/downward diagonal direction with respect to a horizontal line of a central portion of the illustrated housing 120.

As in state 1001, the fifth holding part 910 may be inserted into the first holding recess 127a while the sixth holding part 970 is pressed in a direction of the fifth holding part 910. A thickness of the holding area 910a of the fifth holding part 910 may be formed to be similar to or smaller than a thickness of the first holding recess 127a. While the fifth holding part 910 is inserted into the first holding recess 127a, at least a portion of the holding area 910a may contact an inside of the first holding hangover portion 124a.

When a pressure applied to the sixth holding part 970 is released after the sixth holding part 970 is pushed in in a direction of the inclined surface, on which the second holding recess 127b is formed, in a state, in which the fifth holding part 910 is inserted into the first holding recess 127a, the holding rail 970a of the sixth holding part 970 may be inserted into the second holding recess 127b as in state 1003. Correspondingly, at least a portion of the holding rail 970a of the sixth holding part 970 may be disposed to contact an inside of the second holding hangover portion 124b. A thickness of the holding rail 970a of the sixth holding part 970 may be formed to be similar to or smaller than a thickness of the second holding recess 127b. According to various embodiments, a thickness of the holding area 910a of the fifth holding part 910 and a thickness of the holding rail 970a of the sixth holding part 970 may be the same or may be different according to sizes of the holding recesses 127a and 127b. According to various embodiments, in a state, in which widths of the holding recesses 127a and 127b are the same, a thickness of the holding area 910a of the fifth holding part 910 and a thickness of the holding rail 970a of the sixth holding part 970 may be different. According to various embodiments, the widths of the holding recesses 127a and 127b may be different.

According to various embodiments, the fifth holding part 910 and the sixth holding part 970 may employ a structure, in which a spacing recess is formed at a central portion thereof, as described above in FIGS. 5A and 5B.

A wearable electronic device according to one of the above-described various embodiments may include a housing 120, and a strap 131 connected to one side of the housing, the housing may include at least one strap connecting structure 120a, in which the strap is coupled to at least a portion of an outside thereof, the at least one strap connecting structure may include a housing body 122, an opening 125 formed to an outside of the housing body (or from a center of the housing body in an outward direction) and into which a portion of the strap is inserted, a first holding recess 127a formed in a first diagonal direction between an inward direction of the housing body from the opening and a vertical direction with respect to a horizontal direction, and a second holding recess 127b formed in a second diagonal direction between the inward direction of the housing body from the opening and the vertical direction with respect to the horizontal direction and disposed to correspond to the first holding recess in the vertical direction, and the strap may include a strap body 131_1, a holding body 320 connected to one side of the strap body, a first holding part protruding from one end of the holding body in an inward direction of the housing and inserted into the first holding recess, and a second holding part 200 disposed at an opposite end of the holding body and inserted into the second holding recess.

According to various embodiments, the first holding recess may include a first inclined surface formed in an inward direction and an upper direction from an outside of the housing, and having an inclination angle that is larger than 0 when the horizontal direction is defined as 0 degrees, and a first holding hangover portion formed to be spaced apart from the first inclined surface to an outside of the housing body by a specific interval.

According to various embodiments, the second holding recess may include a second inclined surface having an inclination angle that is smaller than 0 degrees in an inward direction and a downward direction, and a second holding hangover portion formed to be spaced apart from the second inclined surface to the outside of the housing by a specific interval and spaced apart from the first holding hangover portion with respect to the opening.

According to various embodiments, sizes of absolute values of the inclination angles of the first inclined surface and the second inclined surface may be the same.

According to various embodiments, a lower end of the first inclined surface and an upper end of the second inclined surface may be connected to each other.

According to various embodiments, a size of the first holding recess may be larger than a thickness of an end of the first holding part.

According to various embodiments, a size of at least a portion of the opening may be formed to be smaller than a spacing distance between an upper end of the first holding part and a lower end of the second holding part.

According to various embodiments, a size of the opening may be larger than a spacing distance between an upper end of the first holding part and a lower end of the second holding part in a state, in which the second holding part is moved by an external pressure.

According to various embodiments, the first holding part may include a basic base extending from the holding body in an inward direction of the housing, and a holding area extending in a diagonal direction between the horizontal direction and an upward direction in the basic base or in a diagonal direction between the vertical direction and the upward direction and inserted into the first holding recess.

According to various embodiments, the second holding part may include a holding base formed to have a specific curvature, a holding rail extending from a front surface of a periphery of one side of the holding base in, among directions that are perpendicular to the front surface, a downward direction, at least two hooks extending from a rear surface of the holding base in, among directions that are perpendicular to the rear surface, an upward direction, an elastic fixing structure disposed between the hooks, and an elastic member fixed to the elastic fixing structure.

According to various embodiments, the holding body may include a holding space, in which the second holding part is seated, a holding part bottom, which the elastic member of the second holding part contacts, holding steps coupled to the hooks of the second holding part.

According to various embodiments, the holding body may further include guide grooves formed in the holding steps.

According to various embodiments, the second holding part may further include guide bosses that are disposed adjacent to the hooks and at least some of which are inserted into the guide grooves.

According to various embodiments, the holding body may be formed of a material that is different from the strap fixing part.

According to various embodiments, the second holding part may include a second basic base spaced apart from the first holding part at an opposite part to one side of the holding body, on which the first holding part is formed, and extending in a direction of the housing body, and a holding rail formed to have a specific inclination angle at an end of the second basic base.

According to various embodiments, the first holding part may include a first holding area inserted into one side of the first holding recess, a second holding area inserted into an opposite side of the first holding recess, and a first spacing recess corresponding to an empty space disposed between the first holding area and the second holding area.

According to various embodiments, the second holding part may include a first holding rail inserted into one side of the second holding recess, a second holding rail inserted into an opposite side of the second holding recess, and a second spacing recess corresponding to an empty space disposed between the second holding rail and the second holding area.

According to various embodiments, the strap connecting structure may further include a first strap contact area formed on one side of the first holding recess and the second holding recess with respect to the horizontal direction, and a second strap contact area formed on an opposite side of the first holding recess and the second holding recess with respect to the horizontal direction.

According to various embodiments, the strap may further include a first wing part extending from the holding body in a first direction and seated in the first strap contact area, and a second wing part extending from the holding body in a second direction and seated in the second strap contact area.

According to various embodiments, the wearable electronic device may further include a display, at least a portion of which is inserted into the housing.

According to various embodiments, the wearable electronic device may further include a display, and at least a portion of the display may be held on one side of the housing and at least a portion thereof may be exposed to an outside.

A strap structure (or a strap) according to one of the above-described various embodiments may be connected to one side of a housing, may include a strap body, a holding body connected to one side of the strap body, a first holding part protruding from one end of the holding body in an inward direction, and inserted into an inside of the housing while having an inclination angle of a positive value that is larger than 0 degrees and smaller than 90 degrees in a direction that faces the inside of the housing when a horizontal is defined as 0 degrees, and a vertical direction is defined as 90 degrees or −90 degrees, and a second holding part disposed at an opposite end of the holding body and inserted into the inside of the housing while having an inclination angle of a negative value that is smaller than 0 degrees and larger than −90 degrees, and the first holding part and the second holding part may be symmetrical to each other vertically with respect to the horizontal direction.

In the disclosure, the expressions "have", "may have", "include" and "comprise", or "may include" and "may comprise" used herein indicate existence of corresponding features (e.g., components such as numeric values, functions, operations, or parts) but do not exclude presence of additional features.

In the disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in the disclosure may be used to refer to various components regardless of the order and/or the priority and to distinguish the relevant components from other components, but do not limit the components. For example, "a first user device" and "a second user device" indicate different user devices regardless of the order or priority. For example, without departing the scope of the disclosure, a first component is referred to as a second component, and similarly, a second component is referred to as a first component.

It will be understood that when a component (e.g., a first component) is referred to as being "(operatively or communicatively) coupled with/to" or "connected to" another component (e.g., a second component), it may be directly coupled with/to or connected to the other component or an intervening component (e.g., a third component) may be present. In contrast, when a component (e.g., a first component) is referred to as being "directly coupled with/to" or "directly connected to" another component (e.g., a second component), it should be understood that there are no intervening component (e.g., a third component).

According to the situation, the expression "configured to" used in the disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other parts. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of the disclosure. In some cases, even if terms are terms which are defined in the disclosure, they may not be interpreted to exclude embodiments of the disclosure.

An electronic device according to various embodiments of the disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments, the wearable device may include at least one of an accessory type (e.g., watches, rings, bracelets, anklets, necklaces, glasses, contact lens, or head-mounted-devices (HMDs)), a fabric or garment-integrated type (e.g., an electronic apparel), a body-attached type (e.g., a skin pad or tattoos), or a bio-implantable type (e.g., an implantable circuit).

According to various embodiments, the electronic device may be a home appliance. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, and the like.

According to another embodiment, an electronic device may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, Global Navigation Satellite System (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, automated teller machines (ATMs), points of sales (POSs) of stores, or internet of things (e.g., light bulbs, various sensors, electric or gas meters, sprinkler devices, fire alarms, thermostats, street lamps, toasters, exercise equipment, hot water tanks, heaters, boilers, and the like).

According to an embodiment, the electronic device may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic device may be one of the above-described devices or a combination thereof. An electronic device according to an embodiment may be a flexible electronic device. Furthermore, an electronic device according to an embodiment of the disclosure may not be limited to the above-described electronic devices and may include other electronic devices and new electronic devices according to the development of technologies.

The module or the program module according to various embodiments may include at least one of the above components, and a portion of the above sub-components may be omitted, or additional other sub-components may be further included. Alternatively or additionally, some components (e.g., the module or the program) may be integrated in one component and may perform the same or similar functions performed by each corresponding components prior to the integration. Operations performed by the module, the program module, or other components according to various embodiments of the disclosure may be executed sequentially, in parallel, repeatedly, or in a heuristic method. Also, at least some operations may be executed in different sequences, omitted, or other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A wearable electronic device comprising:
    a housing; and
    a strap connected to one side of the housing,
    wherein the housing comprises:
        at least one strap connecting structure, in which the strap is coupled to at least a portion of an outside thereof,
    wherein the at least one strap connecting structure comprises:
        a housing body,
        an opening formed from a center of the housing body in an outward direction and into which a portion of the strap is inserted,
        a first holding recess formed to be inclined from an outward direction to an inward direction of the housing body, and
        a second holding recess formed to be inclined from the outward direction to the inward direction of the housing body,
    wherein the first holding recess and the second holding recess are arranged symmetrically when viewed in cross section, and
    wherein the strap comprises:
        a strap body,
        a holding body connected to one side of the strap body,
        a first holding part protruding from one end of the holding body in an inward direction of the housing and inserted into the first holding recess, and
        a second holding part disposed at an opposite end of the holding body and inserted into the second holding recess.

2. The wearable electronic device of claim 1, wherein the first holding recess comprises:
    a first inclined surface formed on an inside surface of the first holding recess opposite the opening extending in an upward direction from a meeting point of the first holding recess and the second holding recess, the first inclined surface having an inclination angle of a positive value that is larger than 0 when a horizontal direction is defined as 0 degrees between −90 degrees and 90 degrees; and
    a first holding hangover portion formed to be spaced apart from the first inclined surface to an outside of the housing body.

3. The wearable electronic device of claim 2, wherein the second holding recess comprises:
    a second inclined surface having an inclination angle of a negative value that is smaller than 0 degrees between a direction that faces an inside surface of the second holding recess opposite the opening opposite the opening in a downward direction from the meeting point of the first holding recess and the second holding recess; and
    a second holding hangover portion formed to be spaced apart from the second inclined surface to an outside of the housing and spaced apart from the first holding hangover portion with respect to the opening.

4. The wearable electronic device of claim 3, wherein sizes of absolute values of the inclination angles of the first inclined surface and the second inclined surface are the same.

5. The wearable electronic device of claim 3, wherein a lower end of the first inclined surface and an upper end of the second inclined surface are connected to each other.

6. The wearable electronic device of claim 1, wherein a size of the first holding recess is larger than a thickness of an end of the first holding part.

7. The wearable electronic device of claim 1, wherein a size of the opening is formed to be smaller than a spacing distance between an upper end of the first holding part and a lower end of the second holding part.

8. The wearable electronic device of claim 1, wherein a size of the opening is larger than a spacing distance between an upper end of the first holding part and a lower end of the second holding part in a state, in which the second holding part is configured to be moved by receiving external pressure.

9. The wearable electronic device of claim 1, wherein the first holding part comprises:
   a basic base extending from the holding body in a direction that faces an inside of the housing; and
   a holding area extending in a diagonal direction between a horizontal axis of a top of the housing body in the basic base or in a diagonal direction between a vertical axis and the top of the housing body and inserted into the first holding recess.

10. The wearable electronic device of claim 1,
    wherein the second holding part comprises:
    a holding base formed to have a specific curvature,
    a holding rail extending from a front surface of a periphery of one side of the holding base in, a direction that is perpendicular to the front surface, downward from the front surface,
    at least two hooks extending from a rear surface of the holding base in, a direction that is perpendicular to the rear surface, an upward direction,
    an elastic fixing structure disposed between the hooks, and
    an elastic member fixed to the elastic fixing structure, and
    wherein the holding body comprises:
    a holding space, in which the second holding part is seated,
    a holding part bottom, which the elastic member of the second holding part,
    holding steps coupled to the hooks of the second holding part and
    guide grooves formed in holding steps.

11. The wearable electronic device of claim 10, wherein the second holding part comprises:
    guide bosses disposed to be adjacent to the hooks and at least portions of which are inserted into the guide grooves.

12. The wearable electronic device of claim 1, wherein the first holding part comprises:
    a first holding area inserted into one side of the first holding recess;
    a second holding area inserted into an opposite side of the first holding recess; and
    a first spacing recess corresponding to an empty space disposed between the first holding area and the second holding area.

13. The wearable electronic device of claim 12,
    wherein the second holding part comprises:
    a first holding rail inserted into one side of the second holding recess,
    a second holding rail inserted into an opposite side of the second holding recess, and
    a second spacing recess corresponding to an empty space disposed between the first holding rail and the second holding rail, and
    wherein the strap connecting structure further comprises:
    a first strap contact area formed on one side of the first holding recess and the second holding recess with respect to a horizontal direction, and
    a second strap contact area formed on an opposite side of the first holding recess and the second holding recess with respect to the horizontal direction.

14. The wearable electronic device of claim 13,
    wherein the second holding part comprises:
    a second basic base spaced apart from the first holding part at an opposite part to one side of the holding body, on which the first holding part is formed, and extending in a direction of the housing body, and
    a holding rail formed to have a specific inclination angle at an end of the second basic base, and
    wherein the strap further comprises:
    a first wing part extending from the holding body in a first direction and seated in the first strap contact area, and
    a second wing part extending from the holding body in a second direction and seated in the second strap contact area.

15. A strap structure connected to one side of a housing, the strap structure comprising:
    a strap body;
    a holding body connected to one side of the strap body;
    a first holding part protruding from one end of the holding body in a direction that faces an inside of the housing, and inserted into the inside of the housing while having an inclination angle of a first value that is larger than 0 degrees and smaller than 90 degrees from a horizontal axis when the strap body is on a flat surface in a direction that faces the inside of the housing when a horizontal direction that is parallel to a front surface of the housing in a state, in which a center of the housing is positioned to face an upper side; and
    a second holding part disposed at an opposite end of the holding body and inserted into the inside of the housing while having an inclination angle of a second value that is smaller than 0 degrees and larger than −90 degrees,
    wherein the first holding part is configured to be inserted into a first holding recess formed to be inclined from an outward direction to an inward direction of the holding body; and
    wherein the first holding part is configured to be inserted into a second holding recess formed to be inclined from the outward direction to the inward direction of the holding body,
    wherein the first holding recess and the second holding recess are arranged symmetrically when viewed in cross section, and
    wherein the first holding part and the second holding part are symmetrical to each other vertically with respect to the horizontal direction.

* * * * *